United States Patent
Patch et al.

(10) Patent No.: US 12,458,010 B2
(45) Date of Patent: Nov. 4, 2025

(54) INTELLIGENT INSECT TRAP AND MONITORING SYSTEM

(71) Applicant: THE PENN STATE RESEARCH FOUNDATION, University Park, PA (US)

(72) Inventors: Harland Patch, University Park, PA (US); Nelson Daniel Troncoso Aldas, University Park, PA (US); Eric Homan, University Park, PA (US); Vijaykrishnan Narayanan, University Park, PA (US); Codey Mathis, University Park, PA (US); Chonghan Lee, University Park, PA (US); Christina Grozinger, University Park, PA (US)

(73) Assignee: The Penn State Research Foundation, University Park (PA)

( * ) Notice: Subject to any disclaimer, the term of this patent is extended or adjusted under 35 U.S.C. 154(b) by 512 days.

(21) Appl. No.: 17/742,350

(22) Filed: May 11, 2022

(65) Prior Publication Data

US 2022/0361471 A1 Nov. 17, 2022

Related U.S. Application Data

(60) Provisional application No. 63/187,356, filed on May 11, 2021.

(51) Int. Cl.
*A01M 1/02* (2006.01)
*G06V 10/25* (2022.01)
*G06V 10/764* (2022.01)
*G06V 40/10* (2022.01)
(Continued)

(52) U.S. Cl.
CPC ............. *A01M 1/026* (2013.01); *G06V 10/25* (2022.01); *G06V 10/764* (2022.01); *G06V 40/10* (2022.01); *H04N 7/18* (2013.01); *H04N 23/90* (2023.01)

(58) Field of Classification Search
None
See application file for complete search history.

(56) References Cited

U.S. PATENT DOCUMENTS

| 6,738,066 B1 * | 5/2004 | Nguyen | G06T 7/20 |
| | | | 345/474 |
| 11,288,551 B2 * | 3/2022 | Desai | G06F 18/2178 |

(Continued)

FOREIGN PATENT DOCUMENTS

AU 2021105615 A4 * 11/2021 ............. G06N 3/048

OTHER PUBLICATIONS

Kuznetsova, Alina, et al. "The open images dataset v4: Unified image classification, object detection, and visual relationship detection at scale." International journal of computer vision 128.7 (2020): 1956-1981. (Year: 2020).*

(Continued)

*Primary Examiner* — Michelle M Entezari Hausmann
(74) *Attorney, Agent, or Firm* — Quarles & Brady LLP

(57) ABSTRACT

An intelligent insect trap and identification system is disclosed. The intelligent insect trap and identification system can include an insect imaging chamber and identification system. The chamber can include a first cell for accepting insects, a second cell, a first reflector in the second cell, and a first imaging device in the second cell for recording one or more first visual images of the one or more insects in the first cell. Based on the image, the insect imaging chamber can detect and identify the insects. Other aspects, embodiments, and features are also claimed and described.

14 Claims, 8 Drawing Sheets

(51) Int. Cl.
*H04N 7/18* (2006.01)
*H04N 23/90* (2023.01)

(56) References Cited

U.S. PATENT DOCUMENTS

| | | | |
|---|---|---|---|
| 11,842,487 B2* | 12/2023 | Jie | G06V 10/26 |
| 2011/0081045 A1* | 4/2011 | Lee | G06T 7/579 382/103 |
| 2016/0039534 A1* | 2/2016 | Agrawal | B64D 47/08 348/144 |
| 2016/0277645 A1* | 9/2016 | Bitouk | G06T 7/246 |
| 2018/0342070 A1* | 11/2018 | Chen | G06V 20/52 |
| 2019/0050629 A1* | 2/2019 | Olgiati | G06T 7/20 |
| 2019/0130580 A1* | 5/2019 | Chen | G06V 10/82 |
| 2020/0356812 A1* | 11/2020 | Oleynik | H04N 13/246 |
| 2022/0067417 A1* | 3/2022 | Banerjee | H04N 23/64 |
| 2022/0076141 A1* | 3/2022 | Sozzi Sabatini | A01M 7/0089 |

OTHER PUBLICATIONS

Screen captures from YouTube video clip entitled "NittanyAI InsectEye MVP Final Video," 1 page, uploaded on Sep. 8, 2021 by user "Human Being," retrieved from Internet: https://www.youtube.com/watch?v=FcT93dHjOAU.

Narayanan et al., "InsectEye: An Automated Eco-Friendly Insect Trap." Presentation at Center for Pollinator Research Symposium, State College, Nov. 16, 2021. 13 pages.

Grozinger, "2021 Biodiversity Symposium" Feb. 24, 2021, retrieved Dec. 29, 2022 from https://sustainability.psu.edu/programs/research-symposium/ [sustainability.psu.edu], 4 pages.

Penn State, "InsectEye: Autonomous, Adaptive, Continuous Insect Monitoring System" retrieved Dec. 29, 2022, from InsectEye: Autonomous, Adaptive, Continuous Insect Monitoring System—Invent Penn State (psu.edu) [invent.psu.edu], 2 pages.

Grozinger, "Pollinators in Pennsylvania: Our Legacy and Future." Presentation May 19, 2020, Facebook, retrieved Dec. 29, 2022 from https://www.facebook.com/24332892809/videos/250245449403971 [nam10.safelinks.protection.outlook.com], 3 pages.

Pham et al., "InsectEye An Intelligent Insect Trap Nittany AI MVP Phase Document" Aug. 10, 2021, 13 pages.

Pham et al. "InsectEye An Intelligent Insect Trap Nittany AI Prototype Phase Document" Mar. 31, 2021, 12 pages.

Pham et al. "InsectEye An Intelligent Insect Trap Nittany AI Idea Phase Document" Feb. 2021, 5 pages.

* cited by examiner

INTELLIGENT INSECT TRAP AND MONITORING SYSTEM

STATEMENT OF GOVERNMENT SUPPORT

This invention was made with government support under Hatch Act Project No. PEN04716 awarded by the United States Department of Agriculture. The Government has certain rights in the invention.

BACKGROUND

Insect biodiversity decline is ubiquitous, impacting many beneficial insect groups, and driven by multiple synergistic factors including habitat loss, pesticides, and climate change. There is contention about whether the 'insect apocalypse' is a true trend, or if the observed trends are remnants of antiquated and inefficient sampling methodologies that include lethal sampling of specific insect groups occurring as snapshots over time. As the demand for halting the decline continues to increase, research and development continue to advance technologies for trapping and monitoring insect communities.

SUMMARY

The following presents a simplified summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a simplified form as a prelude to the more detailed description that is presented later.

In one example, example insect traps or imaging chambers are disclosed. An insect imaging chamber includes: a first cell for accepting one or more insects; a second cell, the second cell being separated from the first cell; a first reflector in the second cell; and a first imaging device in the second cell for recording one or more first visual images of the one or more insects in the first cell, the one or more first visual images being reflected on the first reflector.

In another example, methods, systems, and/or apparatuses for intelligent insect trap and identification are disclosed. A method includes: receiving a set of a plurality of images including one or more objects; generating one or more bounding boxes around a subset of the one or more objects in an image of the set of the plurality of images, the one or more bounding boxes corresponding to a subset one or more objects; generating an N-frame history buffer for each of the one or more bounding boxes in the image; determining validity of each of the one or more bounding boxes in the image based on the N-frame history buffer of a respective bounding box of the one or more bounding boxes; in response to the validity of each of the one or more bounding boxes in the image, selecting a subset of the one or more bounding boxes in the image; transmitting one or more final bounding boxes based on the subset of the one or more bounding boxes in the image to a deep learning model; and receiving, from the deep learning model, one or more classifications of the one or more final bounding boxes.

These and other aspects of the invention will become more fully understood upon a review of the detailed description, which follows. Other aspects, features, and embodiments of the present invention will become apparent to those of ordinary skill in the art, upon reviewing the following description of specific, example embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while example embodiments may be discussed below as device, system, or method embodiments it should be understood that such example embodiments can be implemented in various devices, systems, and methods.

DETAILED DESCRIPTION

Figure 1:
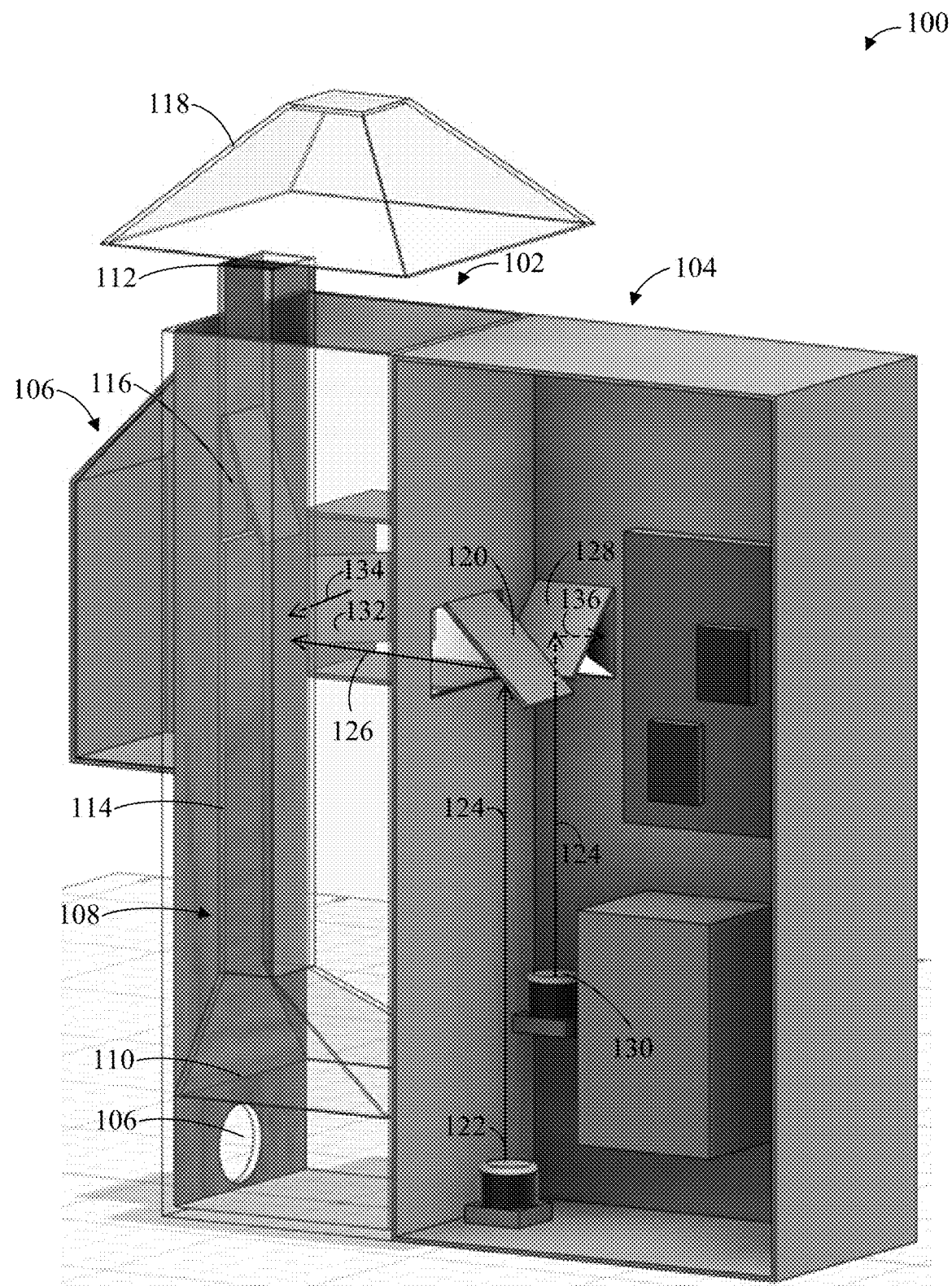
FIG. 1 is a front-facing bird-eye view of an example imaging chamber, in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

The decline of global insect biodiversity is an indisputable reality. To quantify, monitor, and mitigate these declines, more information is needed regarding the location, physiological traits, environmental responses, and number of insects. Having this information available (preferably in large amounts, from a variety of locations, in real time or near real time, and automatically. However, existing methods for gathering this information are too resource intensive, inaccurate, or require too much human intervention. Thus, for monitoring insect communities is continued to Contemporary methods include the periodic lethal collection which provides an incomplete picture of insect community biodiversity in a time-inefficient manner, as the processing of collected specimens is extremely time-intensive.

Example intelligent insect trap and identification system (e.g., example insect imaging chambers and systems to process insect images) in the present disclosure can use a sophisticated camera system paired with novel software for insect detection and identification. The example insect trap is time-efficient, non-lethal, and user-friendly. In addition, the example insect imaging chamber in the present disclosure can be non-lethal traps for insect biodiversity monitoring. The example insect trap and identification system can preprocess collected images (video frames, films, photographs, etc.) to reduce the number of images and only use part of the image (bounding boxes) for insect trap and identification. Accordingly, the example insect trap and identification system can effectively and efficiently detect and classify insects using an AI system. The example insect trap and identification system can be used for a wide audience, including not only research entomologists, but wildlife biologists for government agencies, agricultural corporations hoping to track crop pests, or private landowners curious about the biodiversity on their property. Technologies using this example insect trap and identification system would have applications including, but not limited to: total insect community biodiversity metrics (i.e., abundance and richness), presence or absence of species of concern (i.e., pests or endangered species), and tracking of species interactions (e.g., bee-flower pollination interactions).

The example insect trap and identification system can run on battery powered edge devices. example insect trap and identification system can assist entomologists and expand the current understanding of insect biodiversity and behavior by augmenting existing physical insect camera traps to support AI technologies, while developing AI-based insect identification and pattern recognition algorithms that exploit the rich data generated by the existing trap technologies. Furthermore, this smart component can execute in real time while the insect imaging chamber can also concurrently gather other environmental and contextual data that could be potentially relevant for providing an abundance of organized data.

The following are two sample use cases for an example insect trap and identification system. In both cases, the user wants to compare the insect biodiversity in five different areas of the forest, but the user does not the time to sift through collected insect specimens, nor the money to hire a field technician to visually survey the insect community. While the below examples may describe specific equipment and assume certain file types, insects of interest, etc., it is to be understood that these are merely examples and not limiting of the scope of disclosure herein.

Sample Use Case 1: In this sample use case, the user is using a camera trap that does not have an interface with the example insect identification system, and therefore manually input their data into the example insect identification system via a Web Interface.

User: Research entomologist from a state or government agency.

Assumptions: (1) The user has a folder of .jpeg images or .mp4 videos and accompanying environmental data in a SQL .db, all of which have accurate date and time stamps. (2) The user has access to the example insect identification system via the Web Interface.

Flow: The user loads a folder of .jpeg images or .mp4 videos into the example insect identification system via the Web Interface, designating that they want all of the data on flies (Order Diptera), butterflies and moths (Order Lepidoptera), bees and wasps (Order Hymenoptera), and beetles (Order Coleoptera) in June and July. Additionally, they input a SQL file with corresponding environmental information from their weather logger, and querying the example insect identification system about whether any of these insects were affected by these environmental variables. The example insect identification system produces a report in a table showing the count of insects by Order detected during the specified time, as well as generating scatterplots of insect activity against the environmental data. The user sees that bees were active only in low-wind conditions and high-temperature conditions, and that there were more flies active right after it rained. Finally, the user queries the example insect identification system about the images that have beetles in it, and the example insect identification system provides a ZIP folder of all beetle images. The user can then look for the invasive pest, emerald ash-borer.

Termination Outcome: The user has 1) a results table of all insects identified within their images, 2) folders of the desired insect images, and 3) related figures that show insect activity and various environmental data.

Sample Use Case 2: In another sample use case, the user is using the example insect imaging chamber that interfaces with the insect identification system during operation, and therefore does not need to manually upload their data.

User: Research entomologist from a state or government agency.

Assumptions: (1) The user is using the example insect imaging chamber for insect biodiversity monitoring that takes .jpeg images or .mp4 videos when it detects movement. (2) The example insect imaging chamber is interfaced with the example insect identification system so that whenever a video or image is recorded, it is immediately input through the example imaging identification system and identified.

Flow: Before deployment, the user designates which insect order they want data on (Coleoptera, Diptera, Hymenoptera, Lepidoptera, or 'All'), and which of these they want folders of. Periodically during deployment, the user takes the solid-state hard-drive (SSD) from their insect imaging chamber and replaces it with a fresh one to maintain consistent monitoring of insect communities. They take the collected SSD with data on it and access it from their laptop. Along with the folders of insect videos/images and environmental data already generated by the camera trap, there is an additional folder that the user can access. This has all of the data they had selected for before deployment.

Termination Outcome: The user has 1) a results table of all insects identified within their images, 2) folders of the desired insect images/videos, and 3) related figures that show insect activity and various environmental data.

User interface: The example insect identification system can provide a web interface which contains a button to upload images or videos, a range-selector for choosing a time-frame, a button to send the uploaded files for processing that will return results on graphs and tables for display and analysis, and/or a button to download classification results organized by taxonomy.

The first screen that users will see on the example insect identification web application can be the landing page screen, showing a series of 3 steps that the user will have to follow. First, the user can be asked to upload their data as a folder of images or videos, along with the option to include any associated environmental data available within the folder as a SQL database. They can click "Browse . . . " and navigate to the desired folder on their computer to upload it Next, the user can designate the time frame that they are interested in doing analysis within. Finally, the user then can hit "Analyze", at which point the insect identification system begins working through the folders and finding all images/video where the designated criterion are met (correct group of insects, correct time frame). During this time, the user can see a loading screen that lets them know the process is working. Since some of these folders can contain many gigabytes of data, it can take a bit of time. However, this time is minimal compared to the man-hours required to manually sift through these data without the aid of the insect identification system.

When the processing is finished, the insect identification system can display the "Results" screen. Here, the user can be provided with three outputs: 1) a table of the results, 2) downloadable folders of images sorted into each insect group, and 3) graphs of the insect count over time with taxonomic labels. The table can show the number of unique individual insects or orders that were identified by the insect identification system and allows users to download them into folders organized by taxonomic classification. The downloadable folder of sorted images can allow the user to investigate the images for accuracy and to get any demographics of interest (i.e., sex, life-stage, size).

The insect identification system can be provided as an open source platform. For the hardware, CAD models for the example insect imaging chamber, materials, instructions for assembly can be provided. For the software, a standalone application (the insect identification system) that could be downloaded as an executable.

The example insect trap and identification system can include two main components: an example insect imaging chamber and an example insect identification application. The insect trap and identification system can collect data. The example insect identification application can extract meaningful information from the data.

Hardware Stack: The example insect imaging chamber can represent a minimal baseline for collection of environmental and video data. The example insect imaging chamber can include a tube with two imaging devices (e.g., 12.3 megapixel HD cameras or any other suitable cameras) positioned such that they will capture the top and side views of insects as they crawl through the trap. An additional weather station can capture light, humidity, temperature, wind, and precipitation. All data can be collected by an imaging device and stored to an attached SSD. The chamber can be powered from a marine battery that is charged using an attached 100 Watt solar panel.

To maximize the amount of images with insects, a motion detection module can be implemented. Thus, images that have insects in the frame or image can be only collected and saved to minimize erroneous storage usage.

Software Stack: In some examples, the insect identification system can include a web application. This application can process the data generated by the insect imaging chamber and can allow the user to query information about it. In a non-limiting example, Flask as the framework, OpenCV, Tensorflow and Keras for the AI modules of the system can be used to develop the application.

User Interface: To interact with the insect identification system, a user can run the application using a web browser. For the user interface, a Python Flask web application with HTML, CSS, and JavaScript that uses Tensorflow and Keras for multi-label taxonomic classification can be exploited.

Web Server: For the back-end, Flask, a Python-based framework to develop modern web applications can be used. Among the advantages of using Flask can include: highly compatible with modern software and technologies, light-weight, flexible, and/or a lot of available resources and third party extensions.

AI Modules: Example AI modules can detect and identify insects. The AI modules can allow the example system to make sense of the data that was captured by the insect imaging chamber.

Object Detection: An example object detector in the present disclosure can distinguish multiple objects in one image and generate separate patches (bounding boxes) of data for classification. The example object detector can be based on computer vision techniques. The example object detector can leverage the background subtraction and contour detection methods to create bounding boxes for multiple insects in images gathered from the example imaging chamber. In some example, OpenCV can be used for this module.

Data Filtering: In some examples, the imaging chamber can save the images (photographs or videos) of insects during the day. Thus, it can capture many images or frames of a single insect. Additionally, it can capture images of an empty trap. To alleviate the processing time of the example identification system, the images that are fed into the classification module can be filtered. To distinguish sets of images that belong to the same insect or to a simple background image, object detection and object tracking can be used together. When the insect is detected, tracking that object between frames or images can be started. In this way, the background images and the frames that are belong to the same object can be filtered. This task can be performed by deploying centroid tracking with OpenCV.

Object Classification: An example current classifier model can discriminate between four insect orders: Coleoptera, Diptera, Hymenoptera and Lepidoptera (beetles, flies, wasps/bees, butterflies/moths) at above 90% accuracy. The example classifier model is a VGG16 that has been pre-trained on ImageNet. In some examples, the output layer can be modified to have 13 output classes, each denoting a taxonomic label (e.g. Formicidae) within a taxonomic level (e.g. family), and then fine-tuned the network on 82,000 images of local insects obtained from iNaturalist and GBIF. In further examples, Tensorflow and Keras can be used to train and classify images.

Data Sources: When it comes to machine learning and AI, data is important. Data in the example insect trap and identification system can include images of insects. There could be two resources of data for training and evaluating our models: 1) iNaturalist, and 2) insect imaging chamber.

All the training images can be collected from the iNaturalist webpage (e.g., through an aggregator called GBIF). iNaturalist can provide images of animals and plants which are captured and annotated by the public. Since multiple people corroborated the identification through iNaturalist, identification using the training images from iNaturalist can be highly accurate. Additionally, insect images previously collected from the imaging chamber can be used for the model training.

Imaging Chamber

Figure 2:
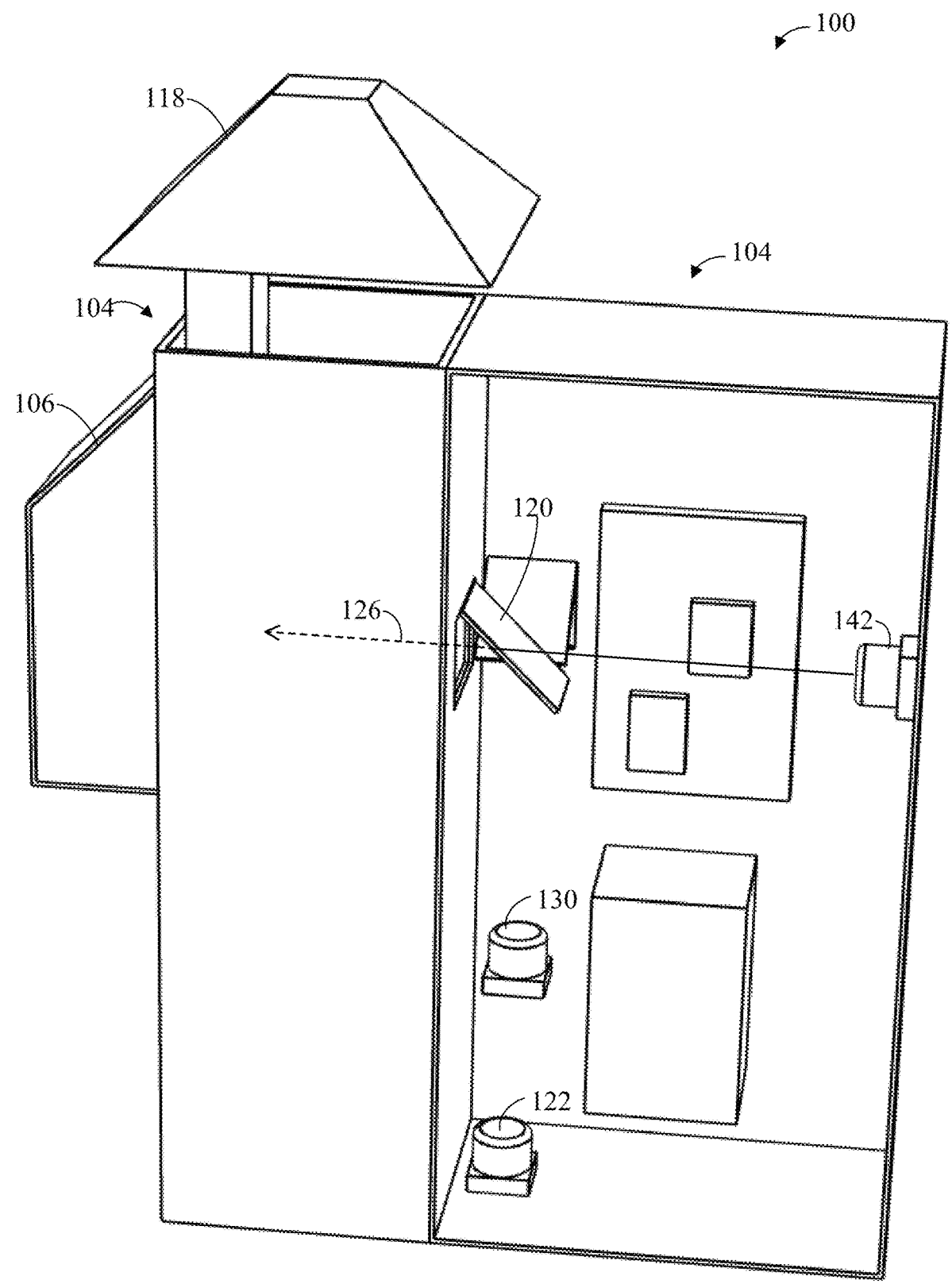
FIG. 2 is another front-facing bird-eye view of the example imaging chamber, in accordance with some aspects of the present disclosure.
Figure 3:
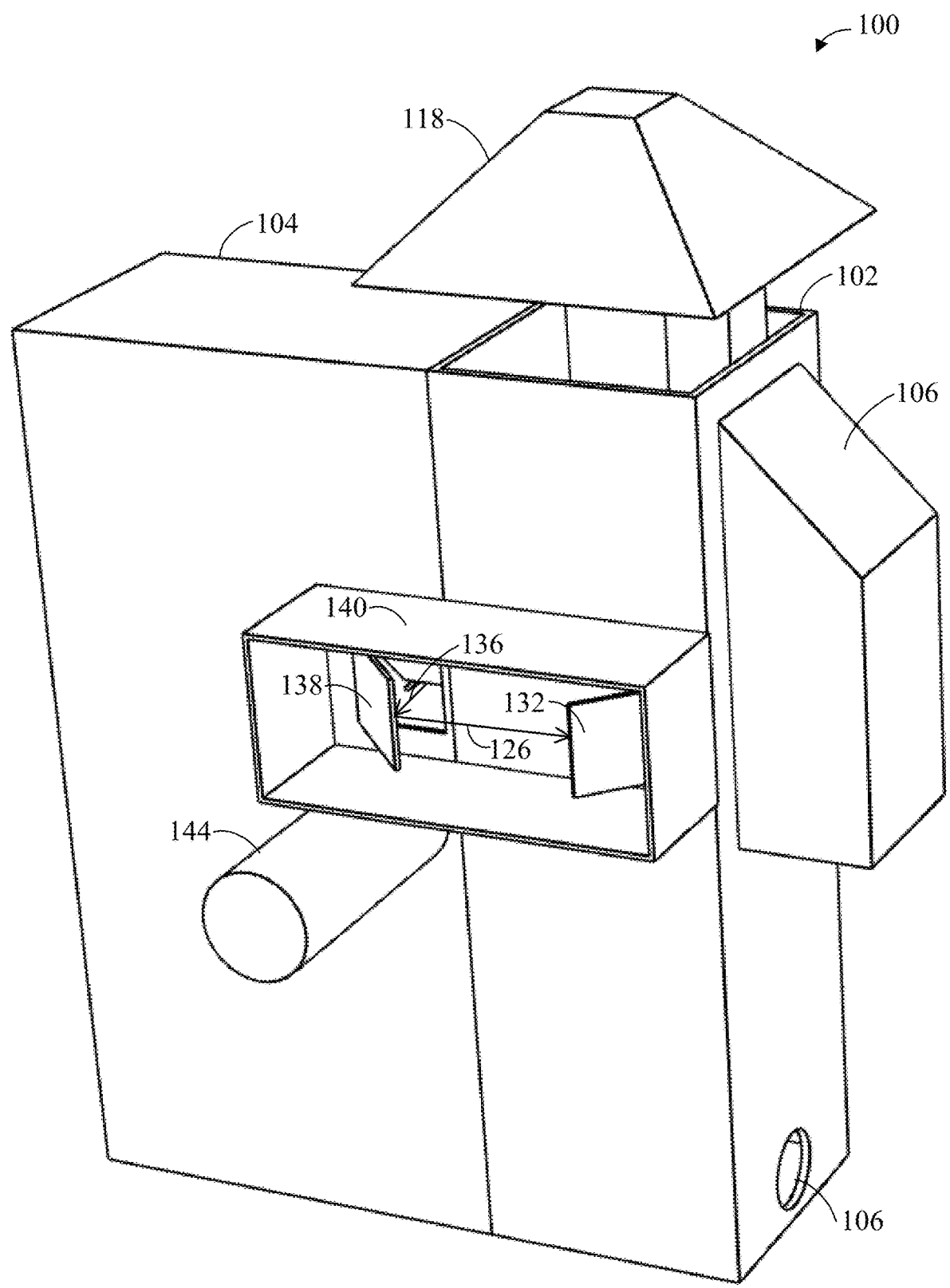
FIG. 3 is a rear-facing bird-eye view of the example imaging chamber, in accordance with some aspects of the present disclosure.

FIG. 1 is a front-facing bird-eye view of an example imaging chamber 100, in accordance with some aspects of the present disclosure. FIG. 2 is another front-facing bird-eye view of the example imaging chamber 100, in accordance with some aspects of the present disclosure. FIG. 3 is a rear-facing bird-eye view of the example imaging chamber 100, in accordance with some aspects of the present disclosure. The imaging chamber can position insects for identification and facilitates insect movement in and out of the chamber.

In some examples, the imaging chamber can include a first cell 102, a second cell 104, and/or a third cell 106. The first cell can be for accepting one or more insects, the second cell 104 can be for recording one or more images including videos of the one or more insects, and/or the third cell can be for capturing the one or more insects.

In some examples, the first cell 102 is configured to accept an insect. In some examples, the insect can indicate one or more insects of the same and/or different species. For example, the first cell 102 can include a chamber opening 106 such that the one or more insects can enter and/or leave the first cell 102 through the chamber opening 106. The chamber opening 106 can be an empty space or a door on a surface of the first cell 102. In some examples, the chamber opening 106 can further include a step (e.g., a flat or curved surface) for the insect to land on the step before entering the imaging chamber 100. In further examples, the chamber opening 106 may further include a light source (e.g., blue and green lights) to encourage the insect to enter or exit the imaging chamber 100. However, the light source can be disposed at any place on the imaging chamber 100 to attract the insect to enter or leave from the first cell 102 through the chamber opening 106.

In further examples, the first cell 102 can include an insect guide tube 108 for placing the insect to be recorded by an imaging device, which can be disposed in the second cell 104. In some scenarios, the insect guide tube 108 can be removable. For example, the insect guide tube 108 can be removed from the imaging chamber 100 and replaced with a different insect guide tube 108 having a different size depending on expected subjects to be placed in the tube 108. In further examples, the insect guide tube 108 can be transparent such that the insect in the insect guide tube 108 can be seen from the outside of the insect guide tube 108 and recorded by an imaging device from the outside of the insect guide tube 108.

In some instances, the insect guide tube 108 can include two openings 110, 112, an elongated tube 114, and/or a trapdoor 116. In some scenarios, a first opening 110 of the insect guide tube 108 can be close to the chamber opening 106. In further scenarios, the first opening 110 can have a trapezoidal prism shape, a truncated cone shape, or any other suitable shape such that the size of one end of the first opening 110 is smaller than the size of the other end of the first opening 110. Thus, it is easy for an insect to enter the insect guide tube 108 via the first opening 110 of the insect guide tube 108. The one end of the first opening 110 can be connected to the elongated tube 114. For example, when an insect enters the insect guide tube 108, the insect can easily enter the other end of the first opening 110 with a big opening. However, as the insect moves toward the elongated tube 114 of the insect guide tube 108, the size of the first opening 110 becomes smaller.

In further scenarios, the elongated tube 114 could be a cuboid shape. However, the elongated tube 114 could be any other suitable shape (e.g., a cubic shape, a cylindrical shape, etc.). In a non-limiting example, the size of the insect entrance of the elongated tube 114 can be designed for an insect to move in a limited and predicted way. The insect entrance of the elongated tube 114 can be a part of the elongated tube 114, which is connected to the first opening 110. An imaging device can record one or more visual images (e.g., photograph, film, video, or any other suitable image) of an expected position of the insect when the insect moves through the elongated tube 114. It should be appreciated that the size of the insect entrance of the elongated tube 114 can be big enough to accept multiple insects at the same time. In another example, the size of the insect entrance of the elongated tube 114 can be designed based on the sizes of insects that the user wants to analyze. Movement and positioning of an insect can also be influenced by alternative surface composition within the insect guide tube 108. For example, one inner surface of the elongated tube 114 can include a rough or adhesive surface for an insect to walk on the rough surface. However, other inner surfaces of the elongated tube 114 can include smooth surfaces for an insect not to be able to walk on the sooth surfaces. In some examples, rough surfaces can be used to orient the insect to an imaging device and to move the insect to the second opening 112 or to the third cell 106. Other surfaces, for example, can be coated in non-stick polytetrafluoroethylene (PTFE, Fluon or Teflon) coatings to prevent the insect from adhering and walking on those surfaces. Thus, the imaging device in the imaging chamber 100 can capture an expected position or side of the insect. In some examples, the elongated tube 114 can include a scent, food, artificial light, natural light from the outside of the imaging chamber 100, or any other suitable means for an insect to pass through the elongated tube 114.

In further scenarios, a second opening 112 of the insect guide tube 108 can be an exit or and entrance of an insect. In some examples, a clear lid 118 can be kept on top of the second opening 112 of the imaging insect guide tube 108 to incentive an insect to leave the imaging chamber 100 while preventing rain or debris from entering the imaging chamber 100. In some instances, the lid 118 can be covered in a light diffusion sheet to prevent outside interference like rain or shadows from interfering with images being taken. In further examples, the lid 118 can be interchangeable depending on the desirable lighting amount to be introduced in the first cell 102. For example, the lid 118 can be clear plexiglass if more light in the first cell 102 is desirable to image (such as in a forest), or the lid 118 can be a light diffusion sheet if the first cell 102 can be exposed to direct sunlight.

In even further scenarios, the trapdoor 116 of the insect guide tube 108 can be connected to the third cell 106 such that an insect moves to the third cell 106 via the trapdoor 114. In some examples, the trapdoor 116 can be part of the insect guide tube 108 or the first cell 102. In a non-limiting examples, the trap door 116 can completely block the elongated tube 114 to force an insect to move into the third chamber 106. In another non-limiting example, the trap door 116 might not completely block the elongated tube 114 for some insects to move into the third cell 104 and for other insects to be able to exit from the insect guide tube 108 via the second opening 112 of the insect guide tube 108. In a further non-limiting example, the trapdoor 116 can be movable to block or unblock the elongated tube 114. In an even further example, the trapdoor 116 can dynamically block the elongated tube 114 when the system in the imaging chamber 804 or the server 802 described in FIG. 8 determines that the insect in the elongated tube 114 is a harmful insect. In some examples, the trapdoor 116 can block the elongated tube 114 by changing the angle of the imaging chamber 100 using the shaft 144. In other examples, the trapdoor 116 can be electrically connected to an electronic hinge to block or open the elongated tube 114 based on the classification result.

In even further examples, the imaging chamber 100 can include the third cell 106. For example, the third cell is configured to capture an insect and can be attached to the first cell 102 (e.g., the insect guide tube 108). In some scenarios, the third cell 106 can selectively capture an insect for further study and identification. In other scenarios, the third cell 106 can be used to selectively exterminate harmful invasive species. In further scenarios, one or more inner surfaces of the third cell 106 can include a non-stick coating surface to prevent the insect from escaping from the third cell.

In some examples, the imaging chamber 100 can include the second cell 104. In a non-limiting scenario, the second cell 104 can be attached to the first cell 102. However, in another scenario, the second cell 104 can be separated from the first cell 102. In a further scenario, each of the first cell 102 and the second cell 104 can have a cubic or a cuboid shape. However, it should be appreciated that the first cell 102 and the second cell 104 can be any other suitable shape (e.g., a pyramid, a cylinder, etc.). In addition, the second cell 104 can have the same shape as or a different shape than the first cell 102. In some embodiments, in the second cell 104 one or more visual images (e.g., photograph, film, video, etc.) are recorded, stored, and/or transmitted via an imaging device and/or a controller. For example, the second cell 104 can include a first reflector 120 and a first imaging device 122 for recording one or more first visual images (e.g., photograph, film, video, etc.) of the insect.

In further examples, the first reflector 120 can reflect light from the insect guide tube 108 to the first imaging device 122. For example, the first reflector 120 can include a glass, metal, or any other suitable material for reflecting light in a desirable direction. In some instances, as the insect guide tube 108 can be transparent, the one or more first visual images of the insect in the insect guide tube 108 of the first cell 102 can be delivered to the reflector 120 and reflected to the first imaging device 122 based on the angle of the reflector 120. In further instances, the angle or position of the first reflector 120 can be adjusted to reflect one or more visual images of an insect in the insect guide tube 108. For example, the first imaging device 122 can disposed in the second cell 104 to record images (e.g., photographs or a video) in a first direction 124. The images in the first direction 124 can be redirected or reflected on the first reflector 120 to a second direction 126. In some examples, the images in the second direction 126 can be images of a first side of the insect guide tube 108 (i.e., the elongated tube 114), and can show a first side of the insect because the first side of the elongated tube 114 is transparent. In some examples, the first reflector 120 can allow the first imaging device 122 with a longer minimum focus length to be compactly packed inside of the second cell 104. In a non-limiting example, the first reflector 120 can redirect or reflect the first visual images of the insect in the elongated tube 114 at a substantial 90-degree angle. It should be understood that the first reflector 120 can redirect or reflect the first visual images of the insect in the elongated tube 114 at any suitable degree angle to place the first imaging device at a suitable position in the second cell 104.

In even further examples, the first imaging device 122 can be a digital camera, a video recording device, a camcorder, a motion picture camera; or any other suitable device capable of recording, storing, or transmitting visual images (e.g., photographs or videos) of insects. In addition, the first imaging device 122 can further include a motion sensor such that the first imaging device 122 records the visual images when the motion sensor detects movement of the insect in the elongated tube 114 to increase battery life if the first imaging device 122 is an battery powered device and save memory space by only storing insect images in the memory.

In further examples, the first imaging device 122 or a controller can dynamically reduce a frame rate of the visual images (e.g., videos) to save battery usage.

In further examples, the second cell 104 can further include a second reflector 128 and a second imaging device 130 for recording one or more second visual images (e.g., photograph, film, video, etc.) of the insect. In some instances, the second reflector 128 and the second imaging device 130 can operate in a similar way to the first reflector 120 and the first imaging device 122. In further instances, the one or more second visual images can be reflected on the second reflector 128. In even further instances, the second reflector 128 can be adjusted to reflect images of a second side of the insect guide tube 108 to the second imaging device 130. Thus, the second reflector 128 can be adjusted to reflect a second side image of the one or more insects to the second imaging device 130 because the second side of the insect guide tube 108 can be transparent. The second side image of the one or more insects can be different than the first side image captured from the first imaging device 122. For example, the first imaging device 122 can capture a top-view image of the insect based on the first reflector 120 while the second imaging device 130 can capture a side-view image of the insect based on the second reflector 128.

In some examples, the second imaging device 130 can additionally use a third reflector 132 to record a side view image of the insect. In some examples, the second reflector 132 can be disposed in a similar way to the first reflector 120. In the examples, the second imaging device 130 can record images (e.g., photographs or a video) in the first direction 124. The images in the first direction 124 can be redirected or reflected on the second reflector 128 to the second direction 126. However, unlike the first visual images from the first imaging device 122, the second visual images can be further reflected on the third reflector 132 to a third direction 134. Thus, in the examples, the images in the third direction 134 can be images of a second side of the insect guide tube 108 (i.e., the elongated tube 114), and can show a second side of the insect because the second side of the elongated tube 114 is transparent.

In other examples, the second reflector 128 can reflect light to a fourth direction 136 (shown in FIGS. 1 and 3), which could be at a right angle to the first direction 124 and the second direction 126. In the examples, a fourth reflector 138 (shown in FIG. 3) can be attached on the outer surface of the second cell 104. The fourth reflector 138 can reflect the light from the second reflector 128 to the second direction 126. The second reflector 128 can reflect the light from the fourth reflector 138 to the second side of the elongated tube 114 of the insect guide tube 108. Thus, in the other examples, the second imaging device 130 can record images (e.g., photographs or a video) in the first direction 124. The images in the first direction 124 can be redirected or reflected on the second reflector 128 to the fourth direction 136. The images in the fourth direction 136 can be redirected or reflected on the fourth reflector 138 to the second direction 126. The images in the second direction 126 can be redirected or reflected on the third reflector 132 to the third direction 134. Then, the images in the third direction 134 can be images of a second side of the insect guide tube 108 (i.e., the elongated tube 114), and can show a second side of the insect because the second side of the elongated tube 114 is transparent. In some examples, the third reflector 132 and the fourth reflector 138 (shown in FIG. 3) can be attached to the outer surfaces of the first cell 102 and the second cell 104, respectively. Thus, natural light via the third reflector 132 and the fourth reflector 138 can be introduced in the first cell 102 to encourage insects to enter or exit the imaging chamber 100 or the elongated tube 114. In further examples, a cover 140 on the outer surface of the imaging chamber 100 can protect the third and fourth reflectors 132, 138 from rain or debris. In a non-limiting example, the distance between the second imaging device 130 and the second reflector 128 is shorter than the distance between the first imaging device 122 and the first reflector 120 to have the same focus length of the first and second imaging devices 122, 130.

In further examples, the second cell 104 can further include a third imaging device 142 (shown in FIG. 2). The third imaging device 142 can record one or more third visual images of the one or more insects. In some examples, the third imaging device can directly record the first side image of the one or more insects on the one or more third visual images through the first reflector 120. For example, the first reflector 120 can be a half mirror. Thus, the one or more first images to the first imaging device 122 can be reflected on the first reflector 120 while the one or more third images to the third imaging device 142 can be captured by the third imaging device 142 through the first reflector 120. In some examples, although the first imaging device 122 and the third imaging device can view the same spot of the insect guide tube 108, the first imaging device 122 and the third imaging device can be different camera types to record different types of images.

In even further example, the imaging chamber 100 can further include a shaft 144 to rotate the imaging chamber 100. For example, the imaging chamber 100 can be rotated by a motor via the shaft 144 to tune the angle of orientation at any degree between vertical and horizontal to manipulate movement for imaging and exit from the imaging chamber 100. Thus, the imaging chamber 100 can be tilted to provide different angles for the insects to walk on depending on targeted subject.

In further examples, the imaging chamber 100 can further include the power supply and voltage converter to power all imaging devices 122, 130, 142 and computer components. In even further examples, the imaging chamber 100 can further include a non-transitory computer readable medium (e.g., memory, solid-state hard drive, etc.) to store the visual images. In even further examples, the imaging chamber 100 can include a transceiver to transmit the visual images to a server and/or receive weather data to synchronize with the captured data. In even further examples, the imaging chamber 100 may include a processor with a memory to transmit data to another imaging chamber or any other suitable remote location. In some examples, the processor in the imaging chamber 100 can provide classification results to other imaging chambers with different deep learning models to identify insects. This can allow for easy remote monitoring of several imaging chambers deployed in close proximity and sending out unknown images for prompt human intervention. It should be appreciated that the power supply, the non-transitory computer readable medium, the transceiver, the processor with the memory can be disposed in a separate location (e.g., a separate cell attached to the imaging chamber 100 or separated from in the imaging chamber 100).

In further examples, the imaging chamber 100 can include a weatherproof housing to contain electronics, which is a small form factor computer (e.g., a Raspberry Pi, Nvidia Jetson, etc.). In addition, the imaging chamber 100 can further include a solar panel to enable autonomous deployment of the imaging chamber 100. Further, the imaging chamber 100 can collaboratively work with other imaging insect chamber to tune the visual recognition engine. For example, tune expectations with what has already been observed in other imaging insect chambers. This can allow lighter weight models to be used and make them computationally efficient.

Figure 4:
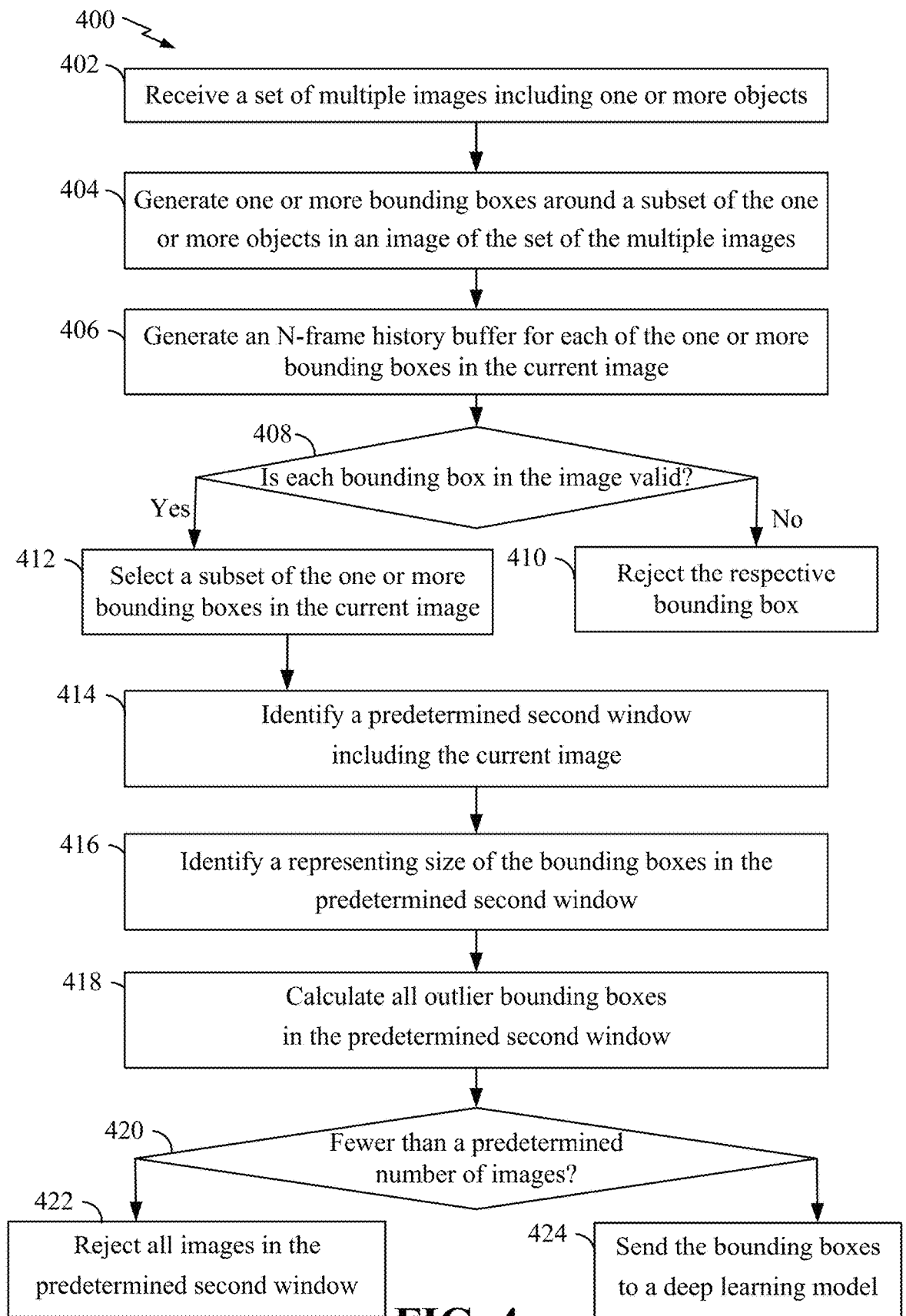
FIG. 4 is a flowchart illustrating an exemplary process for insect detection preprocessing in accordance with some aspects of the present disclosure.

FIG. 4 is a flowchart illustrating an exemplary process for insect detection preprocessing in accordance with some aspects of the present disclosure. As described below, a particular implementation may omit some or all illustrated features and may not require some illustrated features to implement all embodiments. In some examples, any suitable system, apparatus, or means for carrying out the functions or algorithm described below may perform the process 400.

At step 402, a system can receive multiple images in chronological order including one or more objects. For example, the system can receive the multiple images from a user or the imaging chamber 100 illustrated in FIGS. 1-3. In some examples, the multiple images can correspond to multiple video frames of one or more videos. In other examples, the multiple images can correspond to multiple photographs. In further examples, the multiple images can include one or more video frames and photographs. In some examples, the multiple images can capture one or more moving objects. For instance, the one or more objects can include one or more insects. In further examples, each video can include multiple frames (i.e., the multiple images), which show that the one or more objects move in chronological order. A frame or image can include a still image, which captures the one or more objects. A video has a frame rate (e.g., 24 FPS, 30 FPS, 50 FPS, etc.), which is the speed of consecutive frames or images being captured. In some examples, the system can dynamically change the frame rate based on sensing and computing parameters. For example, the system can dynamically reduce the frame rate of a camera in the imaging chamber 100 based on the battery status. Also, the system can increase the frame rate of a camera based on the number of insects or bounding boxes in the frames. However, it should be appreciated that the system can dynamically change the frame rate with any other suitable parameters (e.g., weather, time, etc.)

In some examples, the user can transmit to the system, the multiple images, which include the one or more moving objects. In a non-limiting example, the user can access the system via a web interface and upload the multiple images to the system. In another example, the imaging chamber 100 including one or more imaging devices can record the multiple images of the one or more objects and store the multiple images in a non-transitory computer-readable medium. In a non-limiting examples, the system can receive the multiple images stored in the non-transitory computer-readable medium via any suitable communication network or combination of communication networks (e.g., a Wi-Fi network, a peer-to-peer network, a cellular network, a wired network, etc.).

At step 404, the system can generate one or more bounding boxes around a subset of the one or more objects in an image (a current image in process) of the set of the multiple images. For example, each image of the set of the multiple images can include at least one object (i.e., the subset) of the one or more objects, and a bounding box can be generated around each object in each image of the set of the multiple images. Thus, one or more bounding boxes corresponding to one or more objects can be generated for each image of the set of the multiple images. In some examples, to generate the one or more bounding boxes, the system can exploit a motion detector (e.g., Google Summer of Code motion detector) to extract movement masks of the one or more moving objects. Then, the system can perform blob detection based on the extracted masks. In some examples, the system can generate the bounding boxes by detecting different characteristics (e.g., brightness, color, etc.) of regions of one or more objects in the multiple images compared to surrounding regions. In some examples, the system can discard one or more images, which do not include any extracted movement mask. In further example, the multiple images except the discarded images can be a set of the multiple images.

At step 406, the system can generate an N-frame history buffer for each of the one or more bounding boxes in the image. For examples, the system can determine whether each bounding box in the image (e.g., the current image in process) is valid using based on location and size differences of the bounding box in the N-frame history buffer (e.g., 5-frame history buffer, 7-frame history buffer, 10-frame history buffer, 15-frame history buffer, etc.). In some examples, the N-frame history buffer can include the image (the current image in process) and N preceding images of the image. In some examples, the N preceding images can be N consecutive and previous images in time to the image. In further examples, the number (i.e., N) of preceding images can be determined based on a hyperparameter search. In some examples, a hyperparameter is a machine learning parameter whose value is chosen before a learning algorithm is trained. In further example, the number (i.e., N) of preceding images can be determined by any other suitable parameters (e.g., the user, the application of the imaging chamber 100, types of insects, environment, etc.).

Figure 7:
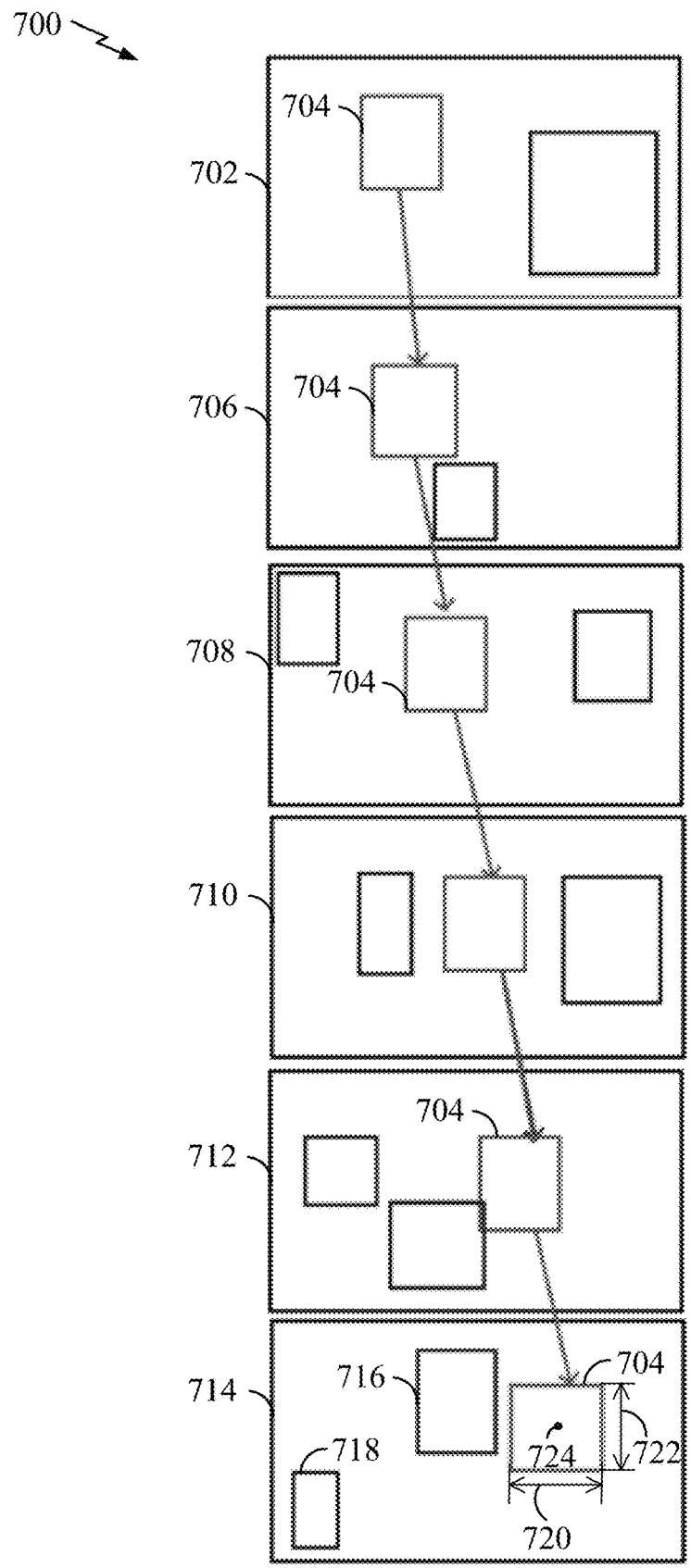
FIG. 7 is an example N-frame history buffer for a bounding box, in accordance with some aspects of the present disclosure.

For example, FIG. 7 illustrates an example 5-frame history buffer for a bounding box 704, in accordance with some aspects of the present disclosure. The example 5-frame history buffer for the bounding box 704 can include a current image 714 in process and its 5 preceding images 702-712 in time. The current image 714 and the 5 preceding images 702-712 can include the bounding box 704. In some examples, the system can determine the size, the length, the height, and/or the position of the bounding box 704 in each images 702-714 to identify movement of the object in the bounding box 704. In further examples, the system can generate multiple 5-frame history buffers for other corresponding bounding boxes 716, 718 in the current image 714. For example, if there are 3 bounding boxes 704, 716, 718 (e.g., first, second, and third bounding boxes) in the current image 714, the system can place the first bounding box 714 into a first 5-frame history buffer (the current image 714 and its 5 preceding images 702-712), the second bounding box 716 into a second 5-frame history buffer (the same current image 714 and its 5 preceding images 702-712), and the third bounding box 718 into a third 5-frame history buffer 718 (the same current image 714 and its 5 preceding images 702-712). In some examples, although the system can place each bounding box in the current image into an N-frame history buffer, the system can reuse, the current image and its N preceding images for multiple N-frame history buffers corresponding to multiple bounding boxes in the current image. In a further scenario, the system can generate multiple N-frame history buffers for each of other images in the multiple images.

At step 408, the system can determine validity of each bounding box of the one or more bounding boxes in the current image based on the N-frame history of a respective bounding box of the one or more bounding boxes in the image. Here, a valid bounding box is a bounding box that meets one or two conditions. For example, the system can determine that a bounding box in the current image is valid if the size or the movement of the bounding box in the N-frame history buffer for the bounding box does not change or move more than one or more thresholds. Thus, if the size of the bounding box in the N-frame history buffer substantially changes or the bounding box moves too fast in the N-frame history buffer, the object in the bounding box may not be an insect, and the system discard the bounding box.

In some examples, the conditions for the validity determination of a bounding box can include: Condition 1) the size of the bounding box in an image (ith) in the N-frame history buffer changes less than a predetermined percentage (e.g., 10%, 20%, 30%, 50%, etc.) of the size of the bounding box in the previous image (i–1th) in the N-frame history buffer and/or Condition 2) the distance between the centroid of the bounding box in the image (ith) in the N-frame history buffer and the centroid of the bounding box in the previous image (i–1th) in the N-frame history buffer is shorter than a predetermined distance (e.g., 5%, 10%, 20%, etc. of the width and/or length of the image (ith) or the previous image (i–1th). In some examples, the predetermined percentage of change in the size of the bounding box and the predetermined percentage of change in the distance of the bounding box can be determined via a hyperparameter search, and can change based on the size and speed of insects to analyze, the exact zoom of the camera, and/or the amount of noise to be filtered out. In further examples, the end user can determine the values of predetermined percentages for their use case. It should be appreciated that the conditions are not limited to the above-listed conditions. In some examples, the system can use different condition(s), additional condition(s), and/or different parameter(s) to improve insect detection.

In some examples, the system can recursively repeat this process for N times {(the current image, Nth image), (Nth image, N–1th image), (N–1th image, N–2th image), . . . , and (2nd image, 1st image) for the validity determination of the bounding box in the image. Thus, the system can determine whether a respective bounding box of each of the one or more bounding boxes between the image and an Nth image in the N-frame history buffer meet Condition 1 and Condition 2. Then, the system can repeat to determine whether the respective bounding box between an (N–i)th image and (N–i–1)th image in the N-frame history buffer meet the first condition and the second condition, wherein the i is from 0 to N+2. Thus, the system can determine that the bounding box is valid when the bounding box meets Condition 1 and Condition 2 for each of the N–i images in the N-frame history buffer. In a non-limiting example, the system can determine that the bounding box in the current image is valid when the bounding box in each image in the N-frame history buffer meets the two conditions. In another non-limiting example, the system can determine that the bounding box in the current image is valid when the corresponding bounding boxes in more than a predetermined number of images (e.g., N–1 images, N–2 images, etc.) in the N-frame history buffer meet the two conditions. In further examples, the system can determine the validity of other bounding boxes in the current image and/or other images with the process described above.

Referring to FIG. 7, the system can determine whether the size (e.g., the width 720 and/or the height 722) of the bounding box 704 in the current image 714 changes equal to or more than 30% of the size of the bounding box 704 in the previous image 712 in the 5-frame history buffer (Condition 1). When the size of the bounding box 704 in the current image 714 changes equal to or more than 30% of the size of the bounding box 704 in the previous image 712, the size of the bounding box 704 changes not in an ordinary manner for a short period of time (the time between the current image 714 and the previous image 712). Thus, the system can determine that the bounding box 704 is not valid. When the size of the bounding box 704 in the current image 714 changes less than 30% of the size of the bounding box 704 in the previous image 712, the system can further determine whether the bounding box between the current image 714 and the previous image 712 in the 5-frame history buffer moves equal to or more than 5% of the width or the height of the bounding box in the current image (Condition 2). In some instances, the distance of the bounding box 704 between the current image 714 and the previous image 712 can be calculated by the distance between the centroid 724 of the bounding box 704 in the current image 714 and the centroid of the bounding box 704 in the previous image 712. Thus, if the bounding box 704 between the current image 714 and the previous image 712 moves equal to or more than 5% of the width 720 or the height 722 of the current image 714, the bounding box 704 moves not in an ordinary manner for a short period of time (the time between the current image 714 and the previous image 712). Thus, the system can determine that the bounding box 704 is not valid. The system can repeat the determination of size changes (Condition 1) and distance changes (Condition 2) of the bounding box 704 in other two preceding images in succession in the N-frame history buffer (e.g., between images 712 and 710, between images 710 and 708, between images 708 and 706, between images 706 and 704 in the 5-frame history buffer). In addition, the system can determine validity of other bounding boxes 716, 718 in the current image 714.

At step 410, when the system determines that a bounding box in the current image does not meet Condition 1 or Condition 2, the system discard the bounding box. At step 412, the system can select a subset of the one or more bounding boxes in the current image. The subset of the one or more bounding boxes can meet Condition 1 and Condition 2 and can be valid. In some examples, the system can enqueue the subset of the one or more bounding boxes in an intermediate storage array. In some examples, the system can repeat steps 406-412 for other bounding box(es) in the current image. In further examples, the system can repeat steps 404-412 for the set of multiple images. Thus, in a non-limiting scenario, the intermediate storage array can include a subset of bounding boxes in the current image and multiple subsets of bounding boxes in the set of multiple images. In some examples, the intermediate storage array does not include an image including all bounding box(es) therein that do not satisfy the conditions in step 408. Thus, the system can reduce the number of bounding boxes and/or images to run for a machine learning algorithm (e.g., a deep learning model) for insect detection and/or classification. In a nonlimiting example, an example algorithm in steps 402-412 can be shown below.

---

Algorithm 1

```
For each image (i) of a set of multiple images (image i ∈ {image 1, . . . , image l) {
    Generate one or more bounding boxes in current image i;
    For each bounding box (j) in current image i (bounding box j ∈ {bounding box 1, . . . , bounding box m)
    {
        place current bounding box j into an N-frame history buffer;
        For each buffer image (k) in the N-frame history buffer (buffer image k ∈
{current image i, N-1 preceding images (images i − 1, . . . i − N − 1)} {
            Determine if current bounding box j in buffer image k meets the size
criteria (e.g., 30%) and the distance criteria (5%) between buffer image k and preceding
buffer image k − 1;
            If current bounding box j in buffer image k does not meet the size criteria
(e.g., 30%) and the distance criteria (5%): {
                Discard bounding box j;
            }Else {
                k = k − 1;
            }
        enqueue bounding box j into an intermediate storage array;
        bounding box j = j + 1;
    }
    current image i = i + 1;
}
```

---

At steps 402-412, the system can perform a first test to see if a bounding box probably include an insect based on movement (N-frame history buffer). Then, at steps 414-424, the system can perform a second test to see if there are enough bounding boxes in a 3 second window to be an insect crawling through the predetermined second window (e.g., 3-second window, which can be set by a user). Thus, a bounding box passing these two tests is likely to include an insect crawling through the imaging chamber 100. In some examples, the system can perform the first test based on each bounding box in an image while the system can perform the second test based on each image including one or more bounding boxes. In further examples, the first and second tests can be performed to identify an insect in a bounding box based on two corresponding assumptions: 1) if there is an insect, it will be a consistent size, and 2) if there is an insect, it will be the majority of the bounding boxes.

At step 414, the system can identify a predetermined second window including the image including the subset of the one or more bounding boxes. In some examples, the subset of one or more bounding boxes can be stored in the intermediate storage array. The system can retrieve the image including the subset of one or more bounding boxes stored in the intermediate storage array. In further examples, the predetermined second window can include multiple images captured during the predetermined period of time (e.g., a predetermined second). In further examples, the number of multiple images during the predetermined second can depend on a recording frame rate of an imaging device. For example, when the frame rate in a video including multiple images is 30 FPS, the number of multiple images during 3 seconds can be 90 images. However, it should be appreciated that the window period and the frame rate can be any suitable window period and any suitable frame rate, respectively. For example, the system can determine the predetermined period of time (e.g., 1 second, 3 seconds, 5 seconds, etc.) based on hyperparameter search and the time for an insect to dwell in front of the imaging device. In other examples, the predetermined period time can be different for another user's use case and can be determined based on a user-settable hyperparameter. In some instances, the image including the subset of the one or more bounding boxes can at the beginning or at the end of the predetermined second wide window. In other instances, the image can be at a predetermined position (e.g., in the middle or any suitable position in the predetermined second wide window) in the predetermined second wide window. In further examples, the images (e.g., 90 frames) in the predetermined second window (e.g., 3-second window) can be included in a video. In some scenarios, the N-frame history buffer can check if a proposed bounding box could be an insect based on movement patterns while the predetermined second window can be a window if there is actually an insect crawling through an insect guide tube 108 in an insect imaging chamber 100 in FIGS. 1-3.

At step 416, the system can identify a representing size of the bounding boxes in the predetermined second window. In some examples, the bounding boxes in the predetermined second window can correspond to each of the subset of the one or more bounding boxes. For example, if there are three bounding boxes (first, second, and third bounding boxes) in the image, the system can identify a first representing size of a first set of bounding boxes in the predetermined second window corresponding to the first bounding box in the image, a second representing size of a second set of the bounding boxes corresponding to the second bounding box, and a third representing size of a third set of the bounding boxes corresponding to the third bounding box. In a non-limiting scenario, a selected bounding box in step 412 can have corresponding bounding boxes in the predetermined second window. In some scenarios, a representing size of the bounding boxes in the predetermined second window can be a median size of the bounding boxes. For example, the median size can be calculated by the average width and the average height of the bounding boxes. In other examples, the representing size of the bounding boxes can be the selected bounding box in the image. In further examples, the representing size of the bounding boxes can be a median size of a subset of the bounding boxes. For example, the subset of the bounding boxes can bounding boxes excluding the largest bounding box and the smallest bounding box in the bounding boxes. It should be appreciated that the representing size can be any other suitable size or area of the bounding boxes in the predetermined second window.

At step 418, the system can identify one or more outlier bounding boxes in the bounding boxes. In some examples, each of the one or more outlier bounding boxes can be a predetermined percentage larger or smaller than the representing size. For example, an outlier bounding box can be a bound box 40% larger or smaller than the representing size of the bounding boxes. That is, if a bound box is 40% larger or smaller than the representing size of the bounding boxes, the system can indicate that the bounding box is not a primary insect and/or noise. It should be appreciated that 40% is a mere example, the threshold percentage to determine an outlier bounding box can be any other suitable percentage of the representing size. In some example, the system can determine the predetermined percentage based on a hyperparameter search and/or the end user's specific use case. In a non-limiting scenario, if the current image includes three valid bounding boxes, three median sizes of bounding boxes in the predetermined second window can exist for three corresponding valid bounding boxes in the current image. After determining outlier bounding boxes, a first set of the images in the predetermined second window can include all three bounding boxes, a second set can include one or two bounding boxes and one or two outlier bounding boxes, and a third set can include all three outlier bounding boxes.

At step 420, the system can determine whether a number of valid images in the predetermined second window is equal to or greater than a predetermined value. In some examples, each of the valid images can include at least one bounding box of the subset. The at least one bounding box can be different from an outlier bounding box of the one or more outlier bounding boxes. In some examples, a valid image to be counted can include the subset of the one or more bounding boxes without any outlier bounding box. In the examples above, the valid images can only be the first set of the images. In other examples, a valid image to be counted can include one or more outlier bounding boxes, but all bounding boxes in the valid image are not outlier bounding boxes. In the examples above, the valid images in this scenario can be the first set and the second set of the images. In a non-limiting scenario, the predetermined value can be 12. For example, in a 3 second window (90 images), the system can determine if there are more than 12 images with "good" bounding boxes (e.g., images with bounding boxes in the 3 second window without any outlier bounding box or without all outlier bounding boxes in the corresponding image). In some examples, the predetermined value (e.g., 12 images) can be determined by a hyperparameter search, and may change depending on the individual use case of an end user based on how long of a dwell time of an insect (e.g., 3 seconds) and environmental factors.

At step 422, if the number of the valid images is less than a predetermined value (e.g., 12 or any other suitable value), the system can reject all the bounding boxes in the predetermined second window.

At step 424, if the number of the valid images is equal to or more than a predetermined value (e.g., 12 or any other suitable value), the system can transmit all the bounding boxes in the predetermined second window to the deep learning model. In some examples, the system can transmit only good bounding boxes in the predetermined second window to the deep learning model.

In some examples, the system can repeat steps 414-424 for other images. In some instances, the other images and the current image can be smaller than the set of multiple images at step 402 because some images at step 402 include all rejected bounding boxes at step 410 and might not include a selected subset of the one or more bounding boxes. Thus, although the system receives a set of multiple images (e.g., multiple videos), the process 400 can select a subset of images and send only valid bounding boxes in the subset of images to the deep learning model. Since the deep learning model receives a subset of bounding boxes in the images rather than all the images, the process 400 can make the deep learning model computationally efficient. In addition, sending bounding boxes can prevent dead insects in another part of the image from throwing off the deep learning model.

| Algorithm 2 |
|---|
| For each image (p) including a selected subset of one or more bounding boxes{<br>   Identify a predetermined second window (e.g., 90 images) including current image p;<br>   Calculate a representing size of bounding boxes in the predetermined second window;<br>     For each image (q) in predetermined second window {<br>       For each bounding box (r) in the selected subset of one or more bounding boxes in image q in the window {<br>         If (the size of bounding box r in the image q is 40% larger or smaller than the representing size of the corresponding bound boxes) {<br>           Bounding box r = Outlier bounding box;<br>         } Else {<br>           Bounding box r = Good bounding box;<br>        r = r + 1;<br>       }<br>     q = q + 1,<br>   }<br>   If (the number of images in the predetermined second window including a good bounding box ≥ 12) {<br>   Transmit all bounding boxes in the predetermined second window to a deep learning model<br>   } Else {<br>   Reject all images in the predetermined second window;<br>p = p + 1;<br>} |

Figure 5:
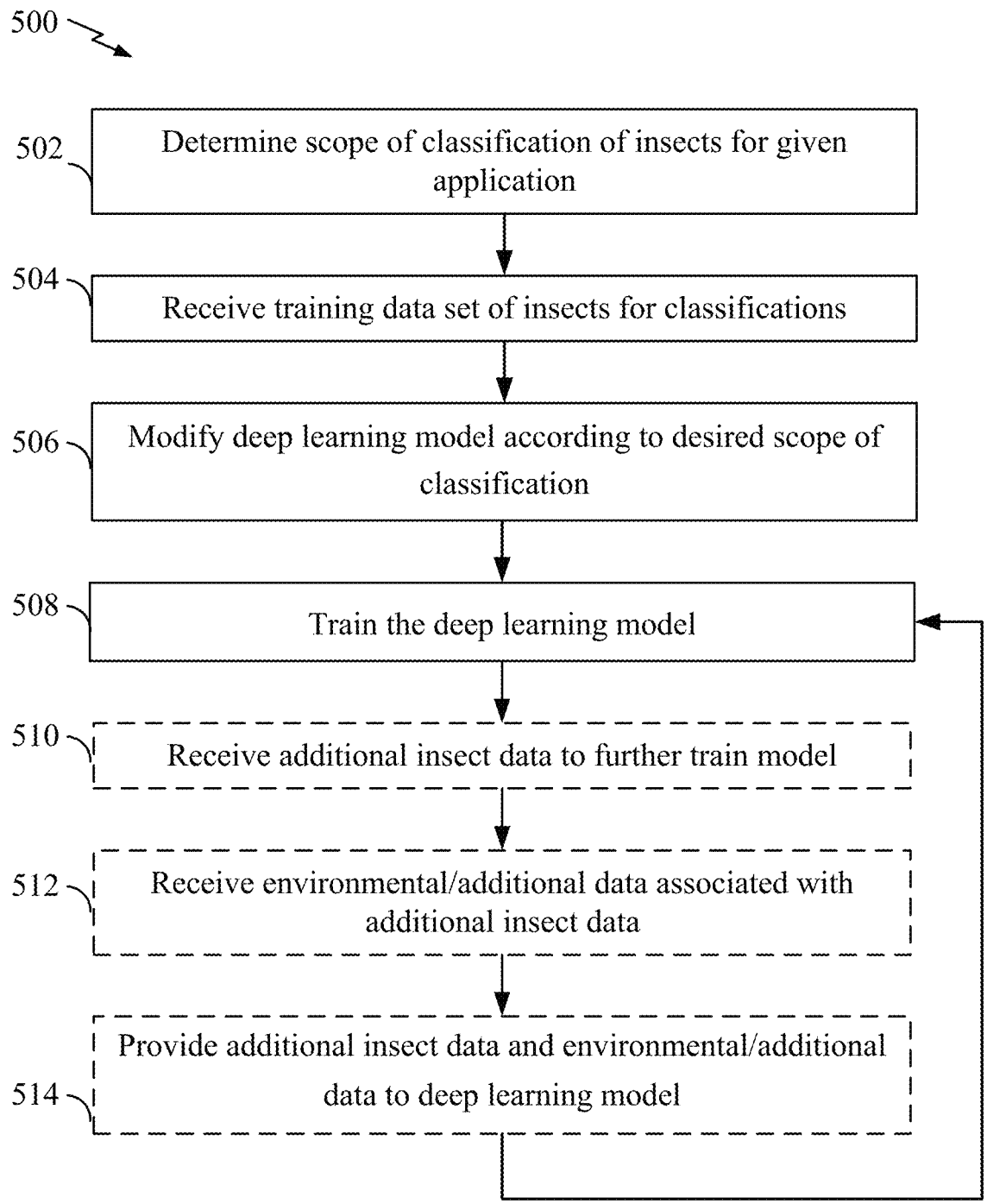
FIG. 5 is a flowchart illustrating an exemplary process for generating and tuning an insect monitoring algorithm and related process, in accordance with some aspects of the present disclosure.

FIG. 5 is a flowchart illustrating an exemplary process for generating and tuning an insect monitoring algorithm and related process, in accordance with some aspects of the present disclosure. As described below, a particular implementation may omit some or all illustrated features and may not require some illustrated features to implement all embodiments. In some examples, any suitable system, apparatus, or means for carrying out the functions or algorithm described below may perform the process 500.

At step 502, a scope of classification of insects may be determined. In some instances, this may include a user or company generating or tuning the process specifying the types of insects that are desired to be classified (e.g., only butterflies, only mosquitos, only given classes or orders of insects, etc.). Alternatively, or in combination, a user or company may specify a geography in which the process will be utilized, such as a country, state, county, ecosystem, etc., from which a set of likely/native insects may be obtained from publicly available sources or pre-defined lists. This information may be obtained from a user through a user interface, or may be predetermined for different models/categories of products to be sold. In embodiments in which this information is obtained from a user, the user interface may, for example, allow a user to select from among various classes and orders of insects, various geographies, or the like. This information will be used to determine the output layer of a deep learning model that will classify insects, as well as the scope of training information needed to train and/or tune the deep learning model for maximum accuracy and predictive power.

At step 504, training data may be received or obtained that will include the classes, species, and types of insects to be identified. In some embodiments, this may include publicly available insect data (e.g., from iNaturalist), or on insect data obtained using cameras of a trap system as described herein. In further examples, the training data can comprise all or a subset of publicly available insect data, taking into account the location of interest to detect insects (e.g., location of imaging chambers) and/or classes or orders that the user wants to classify. For example, in one test embodiment, the inventors scraped around 450,000 insect images taken in the northeast USA that represented the four major orders: Diptera, Hymenoptera, Coleoptera, and Lepidoptera. In some examples, the specific training data (e.g., images or videos) can be obtained regarding the location of interest for the insect detection. For example, when the system is deployed to detect insects in Pennsylvania, the system can reduce the amount of training data (e.g., privately generated insect data only with insects living in Pennsylvania) by limiting to specific classes of insects native to Pennsylvania. In some instances, it may be beneficial to also obtain non-insect training data (e.g., surfaces with shadows, fog, haze, smoke, vegetation, cobwebs, etc.) that may be utilized to help improve classification power. The training data may include label information such as the class, order, family, genus and species of the insect, and/or the sex or role (e.g., queen) of the insect (if visually different). And, the images used in the training data can include any perspectives and/or poses of insects shown.

At step 506, a deep learning model may be modified according to the desired scope of classification. Various types of deep learning models may be utilized. For example, the deep learning model can include a MobileNet V2 model (e.g., from PyTorch's neural network library). In some examples, the system can use a partially pretrained deep learning model (e.g., the MobileNet V2 model originally trained on ImageNet). It should be appreciated that the deep learning model is not limited to the MobileNet V2 model. The deep learning model can be a VGG16 model, or a VGG16 model that has been pretrained on ImageNet, a U-Net model, AlexNet, etc. The deep learning model could be any suitable recurrent models (e.g., recurrent neural networks ("RNNs"), long short-term memory ("LSTM") models, gated recurrent unit ("GRU") models, Markov processes, reinforcement learning, etc.) or non-recurrent models (e.g., deep neural networks ("DNNs"), convolutional neural networks ("CNNs"), support vector machines ("SVMs"), anomaly detection (e.g., using principal component analysis ("PCA"), logistic regression, decision trees/forests, ensemble methods (e.g., combining models), polynomial/Bayesian/other regressions, stochastic gradient descent ("SGD"), linear discriminant analysis ("LDA"), quadratic discriminant analysis ("QDA"), nearest neighbors classifications/regression, naïve Bayes, etc.).

In further examples, the system can modify the deep learning model by removing the last layer of the deep learning model and replacing the last layer with predetermined output neurons to match a predetermined number of classes and/or species to classify. In some examples, the last layer of the deep learning model is a layer that produces final output(s) of the deep learning model. The deep learning model can be modified by removing the last layer of the deep learning model and replacing the last layer with four output neurons to match classes or orders of insects (Diptera, Hymenoptera, Coleoptera, and Lepidoptera), orders, and/or species. In some embodiments, the output layer may be configured such that the outputs include class, order, family, genus, and species information, such that a system utilizing the deep learning model can give a confidence score based on class, order, family, genus, and species (e.g., 99% likely to be Diptera, 98% likely to be Culicidae, 93% likely to be Aedes, but a variety of species may have meaningful confidence scores). However, the number of output neurons can be any other suitable number to match the number of classes, families, genus, species, etc. that the user wants to classify. For example, the last layer is not limited to four output neurons to match the four classes. The last layer can have other classes e.g., Megaloptera, Trichoptera, Siphonaptera, Neuroptera, Mecoptera, Raphidoptera, Strepsipterans, etc.). In further examples, system utilizing the methods disclosed herein can classify the insects in the images (e.g., video frames, photographs, etc.), into specific species in the four major orders (e.g., files and/or mosquitoes for Diptera; bees, bumblebees, wasps, and/or ants for Hymenoptera; ladybugs, scarab beetles, and/or lightning bugs for Coleoptera; and butterflies and moths for Lepidoptera). Thus, the number of output neurons can be the number of species of the insects to detect. In a non-limiting example, a system could modify the last or output layer to have 13 output classes, each denoting a taxonomic label (e.g., Formicidae) within a taxonomic level (e.g., family), and then fine-tune the network on 82,000 images of local insects obtained from iNaturealist and GBIF. To train and classify images, the system can use an open-source software library (e.g., Tensorflow®, Keras, etc.) or a custom application.

At step 508, the deep learning model is trained using the training data sets with associated classification labels. In some examples, multiple deep learning models can be trained, to allow for selection of models in future use based on the location of where image information is being acquired, or the specific types of insects that a device will be used to detect. In some aspects, the multiple deep learning models can reduce the training time of each deep learning model and at the same time reduce the running time of each deep learning model. A validation phase may also be utilized, in which a portion of the training data is reserved and used to ensure the model exhibits sufficient accuracy and performance.

Once the deep learning model has been deployed and is being used to classify insects in images from chambers, traps or other such areas, a further tuning step can be employed to improve accuracy or otherwise modify the model. For example, in step 510, the model may optionally receive additional insect data, such as additional video clips, single images, or sets of images (which each may be solely optical, infrared, depth, etc.). This data may include actual images captures by traps/chambers associated with the system using the deep learning model, or may be acquired by other means (e.g., from individual photos or labs) from any locality or a locality associated with traps/chambers whose images are being classified by the model. In some embodiments, images or videos supplied to the algorithm during run time for which a low classification confidence score is determined (in other words, the model does not have high confidence that the insect in the image belongs to any one given species, genus, etc.) or for which multiple high confidence scores for multiple species are determined, can be provide to an expert user for tagging. The expert will classify the insect in the image, and then the image can be added to a training data set, and the model re-trained or re-tuned.

In step 512, a system utilizing the process may also acquire additional data concerning environmental conditions or activities in the localities from which run-time images are being received, and/or may determine or receive additional data such as physiological, morphological, behavior, or activity/ability traits of insects. For example, when a image or series of images is acquired of a given insect, a time stamp may be recorded. That time stamp may be used to obtain weather information relating to the moment at which the image was taken, as well as recent information regarding a window of time prior to the image being taken (e.g., time since last rainfall, time until/since sunrise/sunset, various meteorological conditions, cloud cover, moon phase, season, last frost, last pesticide spray (e.g., if near a farming operation), etc.). This information could be obtained from the user of the trap, from publicly available sources, and/or from additional sensors located on or near the trap from which the images were acquired.

Additional information may include other image modalities or image conditions (e.g., strobing a UV light so that some images are acquired during UV exposure, or infrared images, zoom, etc.), or additional information that can be derived from the initially acquired image data. For example, the speed or method of movement of an insect could be determined in a variety of ways, including monitoring location of the insect within the trap frame by frame, and determining whether the insect is able to climb or attach to different surfaces within the trap. Similarly, behavioral information such as whether the insect is alone or with other individuals of the same or different species, recent or subsequent presence of other members of the same species, etc.

This additional/environmental data can the be utilized to perform a cyclical or self-learning approach at step 514 to providing additional classification power to the algorithm/process. In some embodiments, a regression or other statistical method may be performed to associate factors like time of day, temperature, time from/to sunrise/sunset, etc. with high confidence-score classifications of insects. Thus, a weighting factor can be associated with any of these factors. Then, when an image is analyzed by the deep learning model and an insufficiently-high confidence score (or two or more similar confidence scores) is returned for a given classification, the presence of additional factors at the time the image(s) were acquired can be considered. If, e.g., time of day, season, or temperature might highly correlate with a given species among the possible classifications, but none of the others, the algorithm can give a preliminary or tentative classification of the given species and notify a user of the factor that was used to supplement the prediction. Or, if an insect is able to climb a specific type of surface, which other likely insects are not, this information could rule out some results of the classifier model. In other embodiments, the additional/environmental data can be combined with image data and provided to the deep learning model as training data, such that a new or re-tuned model can be generated directly from the additional/environmental data. In a non-limiting scenario, the system can receive environmental information from the user, any suitable device (e.g., insect imaging chamber 100, etc.) and/or any suitable database (e.g., National Oceanic and Atmospheric Administration (NOAA) Online Weather Database, etc.). In another non-limiting scenario, the system can access public weather and climate database and receive the environmental information corresponding the location and times of the insects in the multiple images. In combination with the environmental information and the classification results, the system can provide scatterplots of insect activity against the environmental data.

Figure 6:
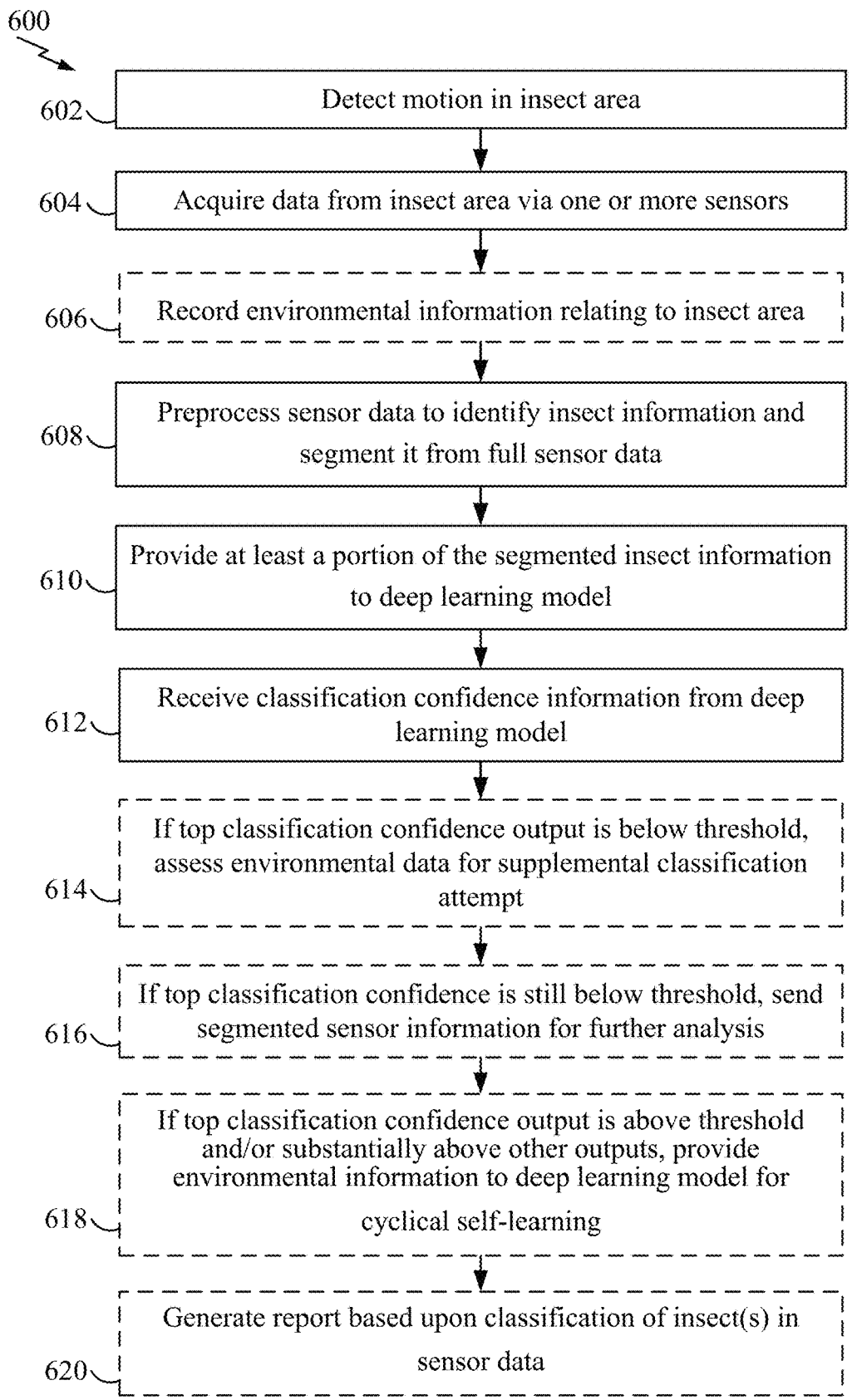
FIG. 6 is a flowchart illustrating an exemplary process for detecting and identifying insects, in accordance with some aspects of the present disclosure.

Referring now to FIG. 6, an example process 600 for detecting and identifying insects is shown. As will be explained further below, this process may be performed by, or modified to be performed by, an insect trap in a location of interest, a remote computer that receives data from an insect trap or other source of insect images, a network of traps and remote computer(s), or combinations thereof. A local device, such as an insect trap, may include some or all of the features described with respect to FIGS. 1-3, or may be a more simple device. In general, the trap will have a chamber with one or more openings into which insects of interest can enter the chamber. The trap may also have a motion detection sensor, a camera, and memory. Some traps may also have remote communications circuitry, such as a local WiFi or Bluetooth transceiver, or cellular or satellite connection, or the like. Other traps may merely have removable storage media, such as SD cards, or similar memory, which are retrieved by a user or drone. Yet further, traps may also have additional sensors such as weather sensors, daylight sensors, pollen sensors, dust sensors, air quality analyzers, GPS, or other sensors to collect and record additional data as described herein. And, other embodiments of a trap may have insect-specific adaptations, such as various colors inside the chamber (for contrast with the colors of various insects), various surfaces (e.g., sticky, rough, smooth, slanted, etc.), and various attractants (e.g., scents, $CO_2$, UV light, etc) that can be alternatingly used.

First, an insect trap or other device situated in a location of interest will perform motion detection 602. As discussed above, this may include highly directionalized or localized motion detection, or motion detection sensors tuned to the size and types of motion of insects (or specific orders, families, etc. of insects such as flying insects). In other embodiments in which a specialized trap is used, more general motion detection may be suitable. By performing motion detection as a gate to further action by the trap, battery power may be preserved. For example, in instances where battery life is high/healthy, a very sensitive motion detection may be used. Where battery life is medium, a more focused motion detection may be used (e.g., it will take a more significant amount of motion to trigger further action). And, where battery life is low (e.g., it has been cloudy, or the season is winter with limited daylight hours to charge the battery by solar cell), the motion detection may be turned off entirely or only turned on intermittently.

When motion has been detected, the insect trap or other local device will begin acquiring data from the portion of the chamber in which the motion was detected. This may include a continuous video acquisition, bursts of still images, or periodic video/image acquisition, or combinations thereof. As long as motion is still being detected and battery life permits, traps may continue to acquire insect data. (As described elsewhere herein, the insect data may include optical images, video clips, IR images, or images in which the insects are alternately exposed to other types of light such as UV, etc.). Each image, clip, etc. that is acquired may be given a time/date stamp. Time information may be obtained from an internal clock of the system or recorded from GPS or other available signals that may be received by the trap.

At step 606, the trap or a remote computer receiving data from the trap, can collect and/or record environmental information and additional information relating to the insect area or chamber in which the insect data was acquired. In some embodiments, this may be weather data for the geography in which the trap was located, in other embodiments this may be data from other local sensors of or near the trap, and in further embodiments this may include information obtained from users of the trap (e.g., such as information from a farmer or local governmental agency regarding pesticide applications, crop planting/harvesting, irrigation, wild fires, extreme weather events like floods, forestry operations, or the like). This may be performed at various times during the process, including before or after use of a deep learning model.

At step 608, the insect data (images, videos, etc.) can be preprocessed as described above with respect to FIG. 4, or via other computer vision techniques such as edge detection, segmentation (e.g., segmenting IR or UV images, or images in which an insect is dark against a light background, etc.) or the like. The full insect data is thus segmented into smaller portions of the data most likely to contain an insect. This step can be performed locally within the trap, or at a remote computer. For example, the trap may send data to a remote computer via a remote connection periodically when battery life is high, or when a more local connection is available (e.g., Bluetooth or WiFi connection with a nearby drone), so that the preprocessing can be performed at more resourceful computers. Alternatively, the preprocessing can occur locally at the trap, so that less insect data needs to be transmitted, and connections/uploads can occur more rapidly and efficiently.

At step 610, the segmented/reduced insect data is provided to a deep learning model, which has been trained according to the methods and alternatives described in FIG. 5. In some embodiments, all of the image/insect data is provided to the deep learning model. In other embodiments, only selective portions of the data is provided to the deep learning model. For example, if the preprocessing step 608 determines that one insect was resident in the trap for a lengthy period of time, resulting in a large number of images/clips, a selected subset of the images/clips may first be provided to the deep learning model (e.g., the first image, the last image, the middle image, or combinations). By doing so, fewer processing and/or data transmission resources are utilized, and battery life may be preserved. In some implementations, one or more deep learning models may be utilized, and may be operated locally via the processor of a trap or may be operated remotely in a cloud or other resourceful environment. In some examples, multiple images provided can be the images with bounding boxes left in step 424 of FIG. 4. However, it should be understood that the multiple images can be frames in the original video(s) or images (e.g., a set of multiple images at step 402 of FIG. 4 or any other suitable images that the user provides. In other embodiments, the images may be acquired from cameras or sensors other than insect traps or from traps/chambers of designs not affiliated with the computers operating the deep learning algorithm (e.g., cell phone images, etc.)

At step 612, the deep learning model processes the segmented insect data to generate classification confidence scores for each class of the output layer of the model. For implementations in which individual images of insects are provided, the deep learning model may return a classification for each image. In implementations where brief video clips or clusters of images are provided, the deep learning model may generate a classification confidence for each image of the clip/cluster, and then perform a statistical analysis of the scores. For example, if at least one image of a clip had a very high confidence score for a specific species of insect, that score could be weighted proportionally higher than the scores of other images of the clip/cluster, or simply could be accepted as the classification score. In other instances, average scores for the clip/cluster may be utilized, and/or outlier scores can be discarded. In some embodiments, the output of the classification model may include classification confidence scores for class, order, family, sub-family, genus, and species. In further embodiments, the classification confidence scores can indicate that the insect is a harmful insect or an insect to be studied. Then, based on the classification confidence scores, the imaging chamber 100 in FIGS. 1-3 can be dynamically adapted to capture the insect. For example, the shaft 144 in the imaging chamber 100 can rotate the imaging chamber 100 such that the angle of the imaging chamber 100 changes for the trapdoor 116 to block the elongated tube 114. Thus, the insect can go into the third cell 106 rather than leave the imaging chamber 100 free. In other examples, based on the classification confidence scores, the trapdoor 116 can be electrically connected to an electronic hinge to block or open the elongated tube 114 to capture the insect.

Optionally, at step 614, additional/environmental information may be taken into account to help make a more confident classification. For example, as described above with respect to FIG. 5, additional/environmental information may be utilized to generate statistical associations or for further tuning a deep learning model. Thus, where image information does not result in a classification of a sufficiently high confidence, additional/environmental information can help. In some embodiments this additional/environmental data may always be used each time the deep learning model is used, or may be reserved for those instances in which image-based classification does not return a clear result.

At step 616, if attempts at classifying an insect in an image did not achieve acceptable results (e.g., a confidence score did not reach a minimum threshold, or no confidence score was significantly higher than others for the outputs of the deep learning model) for a given insect data/image, the data/image may be sent to an expert user for classification, In some embodiments, this may be presented via a user interface which a user can reach via an email or text link, or other alert. The user may then simply discard the data/image, or may label it with a classification (whether one of the classifications prompted by the deep learning model, or a new classification). If the user classifies the insect in the data as a new species of data which the model had not previously detected or been trained to detect, then either the user or the system can initiate steps to modify the deep learning model to account for that type of insect as an output of the system (in which case, some or all of the steps of FIG. 5 may be performed).

At step 618, an optional self-learning or cyclical retraining step may be performed. As described above, a cyclical or self-learning process may be utilized to further tune and refine the deep learning model when results of classification were highly confident. Thus, if the results of the deep learning model's processing of a given image or clip returned a very high confidence that the insect in question was a given species, this positive classification can be utilized to further train the deep learning model to begin to associate that type of insect with environmental factors, etc. that are present. Thus, for example, the dimensionality of data which is utilized by the deep learning model to classify insects may be increased by adding additional features like time, date, weather, which attractant was being used, etc. In some embodiments, this retraining may be performed on a secondary or alternate model, that can be run in addition to or in tandem with the regular deep learning model.

At step 620, a report is generated based upon the results of classification. In some embodiments, this may be a cumulative report that indicates the degree of insect presence and biodiversity at the given location. In other embodiments, the system may report the presence of each insect, or each new species of insect. Thus, the report can include a table showing the count of insects by order or species detected during a predetermined period of time. In further examples, the system can also separately store each subset of multiple images corresponding to the order or species of the insects in the multiple images. For example, the system can provide a file folder of all beetle images. In some examples, the system can filter out "trap happy" insects based on direction of travel (i.e. if a fly crawls top-to-bottom, then bottom-to-top, and finally top-to-bottom again, the system can count the fly only once), how quickly they re-enter the trap, and any other suitable technique.

Yet further embodiments may indicate data that correlates insect presence with different environmental conditions, such as impact of pesticide spraying on different orders, families, genus, of insects, or changes in morphology of insects (e.g., general size of insects is changing, or behavior is changing). In some embodiments, the learnings of the cyclical/self learning operations can be reported to users so as to inform entomologies of behaviors of insects that were not previously recognized.

The reports may also include urgent alerts when certain invasive species are detected. In some embodiments, the reports may indicate to farming operations or counties, or other users of the presence or absence of beneficial insects (e.g., polliators) versus harmful insects. Similarly, when traps are distributed throughout public lands or forestry operations, the presence of various pests can be monitored so that targeted mitigation efforts can take place.

Figure 8:
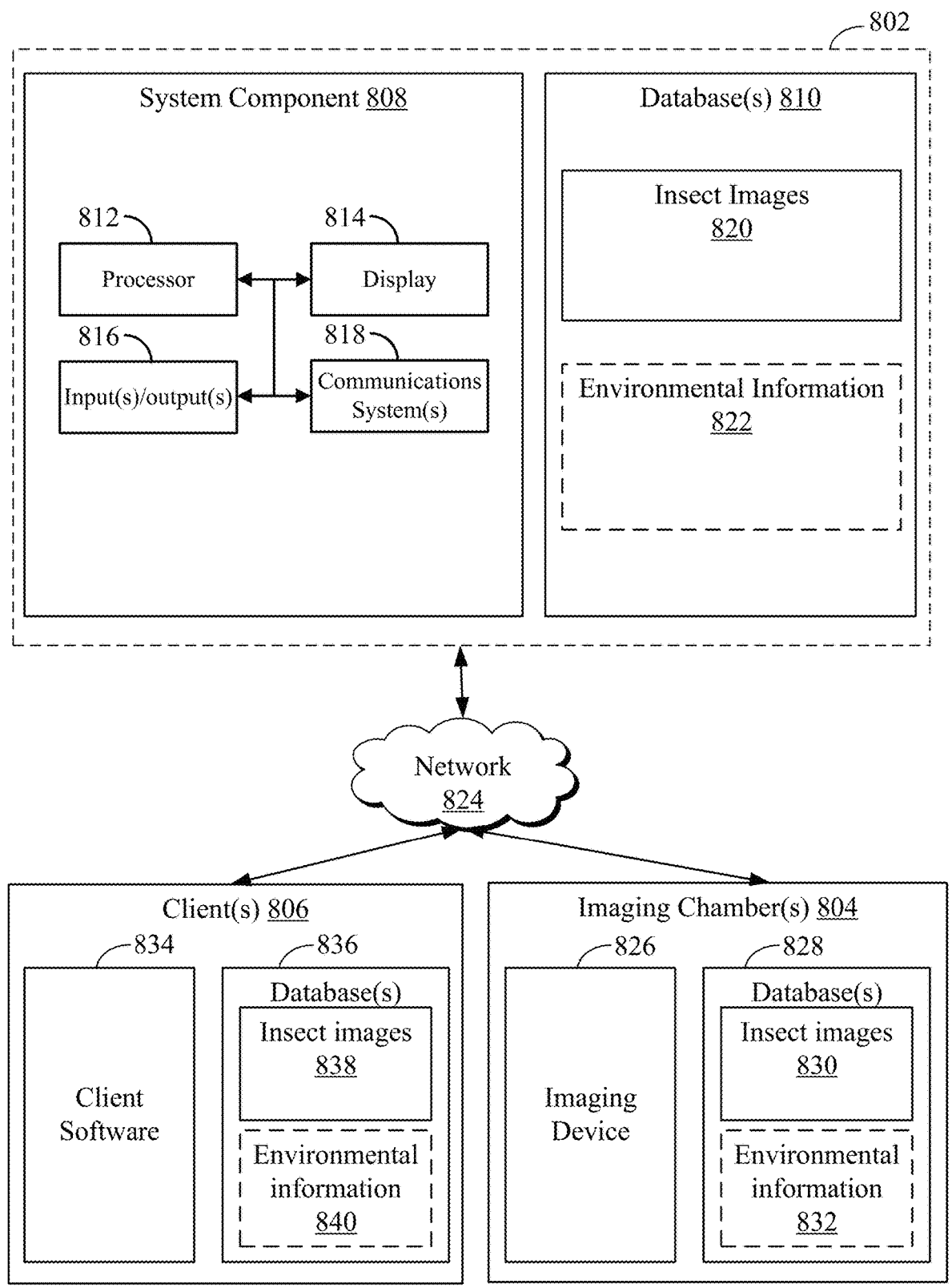
FIG. 8 is a block diagram conceptually illustrating an example of a hardware implementation for concepts disclosed herein.

FIG. 8 is a block diagram conceptually illustrating an example of hardware that can be used to implement implementation for server(s) 802, imaging chamber(s) 806, and/or client(s) 804 disclosed herein. As shown in FIG. 8, in some embodiments, server(s) 802 can include system components 808 and database(s) 810. The system components can include a processor 812, a display 814, input(s)/output(s) 816, and/or communication system(s) 818. In some embodiments, the processor 812 can be any suitable hardware processor or combination of processors, such as a central processing unit (CPU), a graphics processing unit (GPU), an application specific integrated circuit (ASIC), a field-programmable gate array (FPGA), a digital signal processor (DSP), a microcontroller (MCU), etc. In some embodiments, display 304 can include any suitable display devices, such as a computer monitor, a touchscreen, a television, an infotainment screen, etc. In some embodiments, inputs 306 can include any suitable input devices and/or sensors that can be used to receive user input, such as a keyboard, a mouse, a touchscreen, a microphone, etc. In some embodiments, the display 814 can include any suitable display devices, such as a computer monitor, a touchscreen, a television, an infotainment screen, etc. to show a report to the user. In some embodiments, the input(s)/output(s) 816 can include any suitable input devices and/or sensors that can be used to receive user input, such as a keyboard, a mouse, a touchscreen, a microphone, etc. In further embodiments, the user can upload multiple images (e.g., videos, photographs, etc.) via the input(s) 816.

In some embodiments, the communications systems 818 can include any suitable hardware, firmware, and/or software for communicating information over communication network 824 and/or any other suitable communication networks. For example, the communications systems 818 can include one or more transceivers, one or more communication chips and/or chip sets, etc. In a more particular example, the communications systems 818 can include hardware, firmware and/or software that can be used to establish a Wi-Fi connection, a Bluetooth connection, a cellular connection, an Ethernet connection, etc. In further embodiments, the server(s) 802 can receive insect images and/or environmental information from client(s) 806 and/or imaging chamber 804 via the communication systems 818. In addition, the server(s) 802 can transmit a report, stored images, and/or environmental information to client(s) 806 and/or imaging chamber 804 via the communication systems 818.

The database(s) 810 can be in the same server apparatus or a different server. The database can include any suitable storage device or devices that can be used to store instructions, values, etc. that can be used, for example, by processor 812 to present content using display 814, to communicate with client(s) 806 and/or imaging chamber 804. The database(s) 810 can include any suitable volatile memory, non-volatile memory, storage, or any suitable combination thereof. For example, memory 320 can include RAM, ROM, EEPROM, one or more flash drives, one or more hard disks, one or more solid state drives, one or more optical drives, etc. In some embodiments, memory 320 can have encoded thereon a server program for controlling operation of server 220. For example, in such embodiments, processor 312 can execute at least a portion of the server program to perform one or more image processing tasks described herein and/or to perform one or more insect classification and/or identification tasks described herein, present content (e.g., images, reports, information about insects included in image data, etc.), and/or receive insect images 820 and/or environmental information 822 from client(s) 806, imaging chamber (804), and/or other third party to transmit the environmental information. As another example, processor 312 can execute at least a portion of the server program to implement the imaging detection system. In another example, processor 812 can execute at least a portion of processes 400 and/or 500 described above in connection with FIGS. 4, 5, and/or 6.

In some examples, data can be transmitted or received to or from client(s) 806 and/or imaging chamber(s) 804 via communication network 824. The communication network 208 can be any suitable communication network or combination of communication networks. For example, communication network 208 can include a Wi-Fi network (which can include one or more wireless routers, one or more switches, etc.), a peer-to-peer network (e.g., a Bluetooth network), a cellular network (e.g., a 3G network, a 4G network, a 5G network, etc., complying with any suitable standard, such as CDMA, GSM, LTE, LTE Advanced, NR, etc.), a wired network, etc. In some embodiments, communication network 208 can be a local area network, a wide area network, a public network (e.g., the Internet), a private or semi-private network (e.g., a corporate or university intranet), any other suitable type of network, or any suitable combination of networks. Communications links between the server(s) 802 and the client(s) 806 and/or the imaging chamber 804 can each be any suitable communications link or combination of communications links, such as wired links, fiber optic links, Wi-Fi links, Bluetooth links, cellular links, etc.

In further examples, the imaging chamber(s) 804 can include one or more imaging devices 826, and/or database(s) 828 including insect images 830 and/or environmental information 832. The imaging chamber(s) 804 is described above in connection with FIGS. 1-3.

In further examples, the client(s) 806 can include client software 834, and/or database(s) 836 including insect images 838 and/or environmental information 840. In some examples, the client(s) 806 can access a web application of the example imaging detection system implemented in the server(s) 802 via the communication network 824. The client(s) 806 can transmit insect images 838 and/or environmental information 840 to the server(s) 802 and receive a report from the server(s) 802.

In the foregoing specification, implementations of the disclosure have been described with reference to specific example implementations thereof. It will be evident that various modifications may be made thereto without departing from the broader spirit and scope of implementations of the disclosure as set forth in the following claims. The specification and drawings are, accordingly, to be regarded in an illustrative sense rather than a restrictive sense.

What is claimed is:

1. A method for insect classification, comprising:
receiving a set of a plurality of images including one or more objects;
generating one or more bounding boxes around a subset of the one or more objects in an image of the set of the plurality of images, the one or more bounding boxes corresponding to a subset one or more objects;
generating an N-frame history buffer for each of the one or more bounding boxes in the image;
determining validity of each of the one or more bounding boxes in the image based on the N-frame history buffer of a respective bounding box of the one or more bounding boxes;
in response to the validity of each of the one or more bounding boxes in the image, selecting a subset of the one or more bounding boxes in the image;
transmitting one or more final bounding boxes based on the subset of the one or more bounding boxes in the image to a deep learning model;
receiving, from the deep learning model, one or more classifications of the one or more final bounding boxes;
identifying a predetermined second window including the image;
identifying a representing size of bounding boxes in the predetermined second window, the bounding boxes in the predetermined second window corresponding to each of the subset of the one or more bounding boxes in the image;
identifying one or more outlier bounding boxes in the bounding boxes, each of the one or more outlier bounding boxes being a predetermined percentage larger or smaller than the representing size; and
in response to a number of valid images in the predetermined second window being equal to or greater than a predetermined value, transmitting the bounding boxes in the predetermined second window to the deep learning model, wherein each of the valid images includes at least one bounding box of the subset, the at least one bounding box being different from an outlier bounding box of the one or more outlier bounding boxes.

2. The method of claim 1, wherein the representing size of the bounding boxes is a median size of the bounding boxes.

3. The method of claim 1, wherein the predetermined second window comprises multiple images, wherein a total number of the multiple images in the predetermined second window is determined by a frame rate of an imaging device and a predetermined second of the predetermined second window.

4. The method of claim 1, wherein the plurality of images corresponds to a plurality of video frames of one or more videos.

5. The method of claim 1, wherein the N-frame buffer comprises the image and N preceding images of the image for the one or more bounding boxes.

6. The method of claim 5, wherein determining validity of each of the one or more bounding boxes in the image comprises:
 determining whether a respective bounding box of the one or more bounding boxes between the image and an Nth image in the N-frame history buffer meets a first condition,
 determining whether the respective bounding box between the image and the Nth image in the N-frame history buffer meets a second condition;
 repeating to determine whether the respective bounding box between an (N−i)th image and (N−i−1)th image in the N-frame history buffer meet the first condition and the second condition, wherein the i is from 0 to N+2; and
 determining that the respective bounding box is valid when the respective bounding box meets the first condition and the second condition for each of the N−i images in the N-frame history buffer.

7. The method of claim 6, wherein the first condition for the respective bounding box between a first image and a second image is met when a current size of the respective bounding box in the first image changes less than a predetermined percentage of a previous size of the respective bounding box in the second image in the N-frame history buffer; and
 wherein the second condition for the respective bounding box between the first image and the second image is met when a distance between a current centroid of the respective bounding box in the first image and a previous centroid of the respective bounding box in the second image in the N-frame history buffer is shorter than a predetermined distance.

8. An insect trap and identification system comprising:
 an imaging chamber;
 a memory;
 a processor with the memory configured to:
 receive a set of a plurality of images including one or more objects from the imaging chamber;
 generate one or more bounding boxes around a subset of the one or more objects in an image of the set of the plurality of images, the one or more bounding boxes corresponding to a subset one or more objects;
 generate an N-frame history buffer for each of the one or more bounding boxes in the image;
 determine validity of each of the one or more bounding boxes in the image based on the N-frame history buffer of a respective bounding box of the one or more bounding boxes;
 in response to the validity of each of the one or more bounding boxes in the image, select a subset of the one or more bounding boxes in the image;
 transmit one or more final bounding boxes based on the subset of the one or more bounding boxes in the image to a deep learning model;
 receive, from the deep learning model, one or more classifications of the one or more final bounding boxes;
 identifying a predetermined second window including the image;
 identifying a representing size of bounding boxes in the predetermined second window, the bounding boxes in the predetermined second window corresponding to each of the subset of the one or more bounding boxes in the image;
 identifying one or more outlier bounding boxes in the bounding boxes, each of the one or more outlier bounding boxes being a predetermined percentage larger or smaller than the representing size; and
 in response to a number of valid images in the predetermined second window being equal to or greater than a predetermined value, transmitting the bounding boxes in the predetermined second window to the deep learning model, wherein each of the valid images includes at least one bounding box of the subset, the at least one bounding box being different from an outlier bounding box of the one or more outlier bounding boxes.

9. The insect trap and identification system of claim 8, wherein the representing size of the bounding boxes is a median size of the bounding boxes.

10. The insect trap and identification system of claim 8, wherein the predetermined second window comprises multiple images, wherein a total number of the multiple images in the predetermined second window is determined by a frame rate of an imaging device and a predetermined second of the predetermined second window.

11. The insect trap and identification system of claim 8, wherein the plurality of images corresponds to a plurality of video frames of one or more videos.

12. The insect trap and identification system of claim 8, wherein the N-frame buffer comprises the image and N preceding images of the image for the one or more bounding boxes.

13. The insect trap and identification system of claim 12, wherein to determine validity of each of the one or more bounding boxes in the image, the processor is configured to:
 determine whether a respective bounding box of the one or more bounding boxes between the image and an Nth image in the N-frame history buffer meets a first condition,
 determine whether the respective bounding box between the image and the Nth image in the N-frame history buffer meets a second condition;
 repeat to determine whether the respective bounding box between an (N−i)th image and (N−i−1)th image in the N-frame history buffer meet the first condition and the second condition, wherein the i is from 0 to N+2; and
 determine that the respective bounding box is valid when the respective bounding box meets the first condition and the second condition for each of the N−i images in the N-frame history buffer.

14. The insect trap and identification system of claim 13, wherein the first condition for the respective bounding box between a first image and a second image is met when a current size of the respective bounding box in the first image changes less than a predetermined percentage of a previous size of the respective bounding box in the second image in the N-frame history buffer; and wherein the second condition for the respective bounding box between the first image and the second image is met when a distance between a current centroid of the respective bounding box in the first image and a previous centroid of the respective bounding box in the second image in the N-frame history buffer is shorter than a predetermined distance.

* * * * *